United States Patent [19]
Misaizu et al.

[11] Patent Number: 5,646,763
[45] Date of Patent: Jul. 8, 1997

[54] OPTICAL TRANSMITTER AND LASER DIODE MODULE FOR USE IN THE OPTICAL TRANSMITTER

[75] Inventors: Setsuo Misaizu; Sunao Itou, both of Oyama; Takashi Tsuda, Kawasaki, all of Japan

[73] Assignee: Fujitsu Limited, Kanagawa, Japan

[21] Appl. No.: 528,321

[22] Filed: Sep. 14, 1995

[30] Foreign Application Priority Data

Dec. 20, 1994 [JP] Japan .................. 6-317121

[51] Int. Cl.⁶ ............................... H04B 10/04
[52] U.S. Cl. ........................ 359/187; 372/29; 372/34
[58] Field of Search ........................ 359/180, 181, 359/182, 183, 184, 185, 186, 187, 188, 162, 163; 372/29–34

[56] References Cited

U.S. PATENT DOCUMENTS

| | | | |
|---|---|---|---|
| 4,604,753 | 8/1986 | Sawai | 372/29 |
| 4,622,672 | 11/1986 | Coldren et al. | 372/32 |
| 4,884,280 | 11/1989 | Kinoshita | 372/29 |
| 4,924,473 | 5/1990 | Burgyan et al. | 372/38 |
| 5,012,162 | 4/1991 | Chun | 372/32 |
| 5,036,519 | 7/1991 | Ema et al. | 372/32 |
| 5,289,480 | 2/1994 | Koai et al. | 372/38 |
| 5,335,239 | 8/1994 | Herczeg et al. | 372/34 |
| 5,392,305 | 2/1995 | Jakobson | 372/34 |
| 5,412,748 | 5/1995 | Furuyama et al. | 385/92 |
| 5,479,288 | 12/1995 | Ishizuka et al. | 359/163 |
| 5,479,425 | 12/1995 | Tegge | 372/29 |

FOREIGN PATENT DOCUMENTS

| | | | |
|---|---|---|---|
| 60-134636 | 7/1985 | Japan | H04B 9/00 |
| 1-135084 | 5/1989 | Japan | H04B 9/00 |

*Primary Examiner*—Wellington Chin
*Assistant Examiner*—Rafael Bacares
*Attorney, Agent, or Firm*—Helfgott & Karas, P.C.

[57] ABSTRACT

An optical transmitter includes a laser diode module including a laser diode which outputs a light signal to a transmission line, a driving unit which drives the laser diode in accordance with an input signal indicative of data to be transmitted, and a coupling unit for connecting an output of the driving unit to an input of the laser diode module. The coupling unit allows an alternating current to flow through the laser diode and inhibits the output of the driving unit from being subjected to a direct current from the laser diode module.

17 Claims, 24 Drawing Sheets

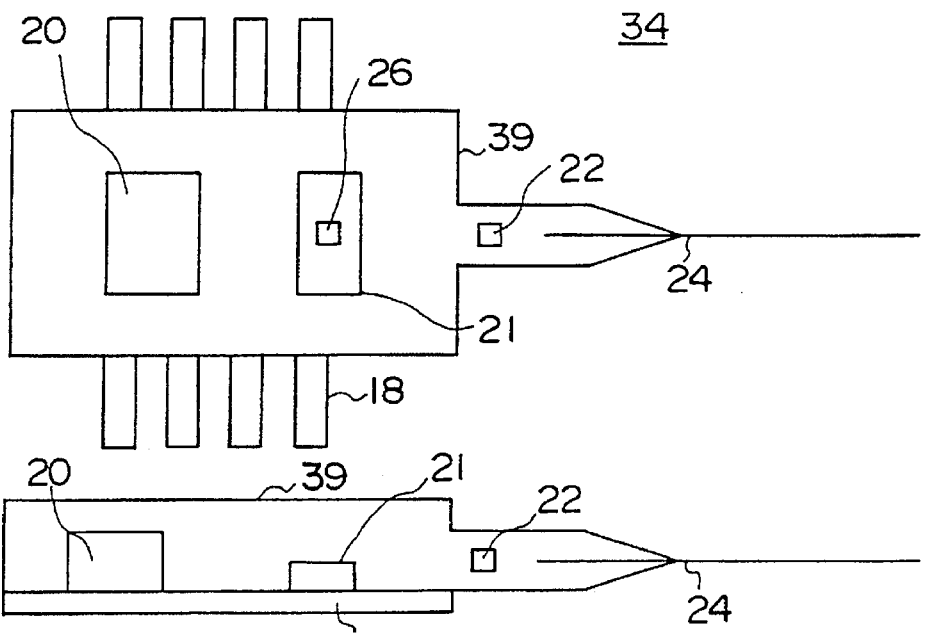
FIG. 7A
FIG. 7B
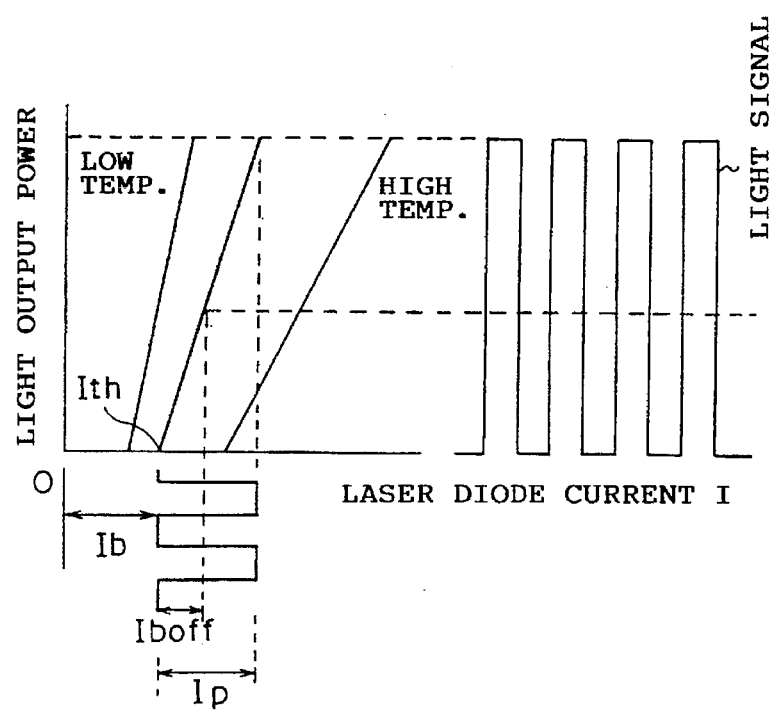
FIG. 8

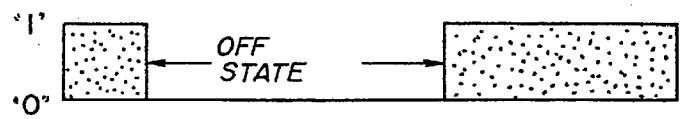
FIG.21A INPUT SIGNAL
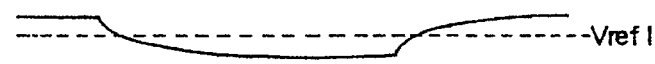
FIG.21B
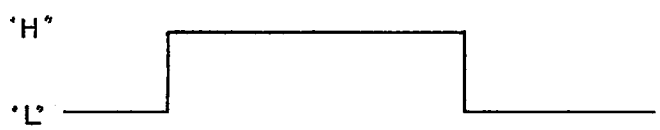
FIG.21C UNIT 60 OUTPUT
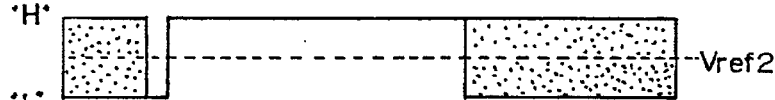
FIG.21D UNIT 33 INPUT VOLTAGE
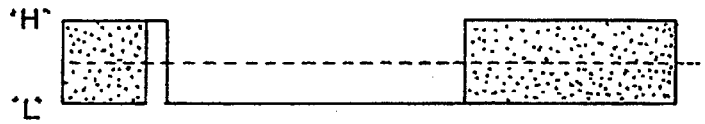
FIG.21E UNIT 33 OUTPUT VOLTAGE
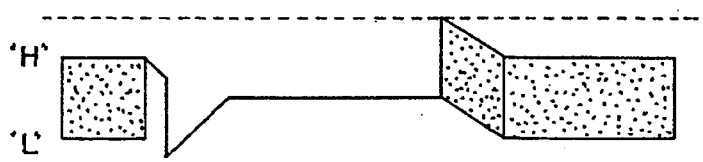
FIG.21F UNIT 34 INPUT VOLTAGE
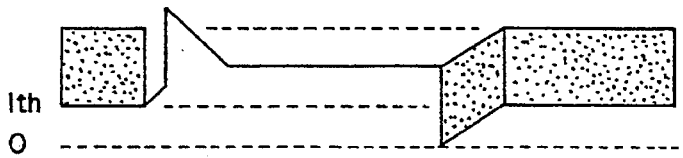
FIG.21G LD CURRENT
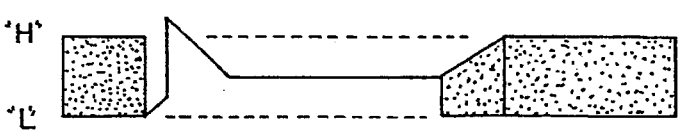
FIG.21H LIGHT OUTPUT

OPTICAL TRANSMITTER AND LASER DIODE MODULE FOR USE IN THE OPTICAL TRANSMITTER

BACKGROUND OF THE INVENTION (1) Field of the Invention

The present invention generally relates to an optical communication in which a light signal indicating digital data is transmitted through an optical transmission line, and more particularly to an optical transmitter in which light is modulated in accordance with digital data and a light signal is output to an optical transmission line. Also, the present invention relates to a laser diode module which is suitable for use in the optical transmitter.

(2) Description of the Related Art

In optical communication, a large quantity of data can be transmitted at a high speed. Currently, optical communication is being applied practically in many industries. Because frequencies of light signals used in the optical communication are extremely high, an intensity modulation is widely used for optical transmitters to modulate light in accordance with digital data.

Generally, an optical transmitter employs a laser diode or some other semiconductor laser as the light source, and light from the laser diode is modulated in accordance with a data signal indicating digital data so that a light signal carrying the data is produced. The light signal is output by the optical transmitter to an optical transmission line for the data transmission.

There is a problem that the output of the laser diode continuously oscillates if an excessive current greater than a threshold current flows in the laser diode. Also, the laser diode has a problem that the input-output characteristic of the laser diode tends to deviate from a desired input-output characteristic for its normal operation when the temperature of the laser diode rises.

It is necessary to always supply a bias current equivalent to the threshold current to the laser diode, in order to avoid the continuous oscillation mentioned above. Also, in order to maintain the desired input-output characteristic for the normal operation, it is necessary to control the temperature of the laser diode to be constant by making use of a Peltier device or some other device. The Peltier device is a thermoelectric device which is capable of controlling the temperature of the laser diode to be constant by utilizing the Peltier effect.

However, there still remains a problem that an optical transmitter including a laser diode module using the Peltier device for controlling the temperature of a laser diode becomes large in size, and the optical transmitter with such a temperature control device requires a larger amount of power than an optical transmitter without the temperature control device.

FIG. 1 shows a conventional optical transmitter 10. In FIG. 1, the optical transmitter 10 includes an input terminal 11, an output terminal 12, a driving unit 13, a laser diode module (LD MOD) 14, an automatic temperature control unit (ATC) 15, and an automatic power control unit (APC) 16. An electrical input signal which indicates data to be transmitted is supplied to the input terminal 11. A light signal is output from the output terminal 12, and it is transmitted to an external device via an optical transmission line. The laser diode module 14 includes a laser diode which outputs the light signal.

The driving unit 13 drives the laser diode module 14 in accordance with the input signal which indicates digital data including a sequence of values of zeros and ones. The driving unit 13 supplies a pulsed current $I_p$ to the laser diode, the pulsed current $I_p$ being in accordance with the input signal. Also, the driving unit 13 controls the amplitude of the pulsed current $I_p$ in accordance with a pulsed-current control signal output from the APC 16.

A bias current $I_b$ which is equivalent to a threshold current of the laser diode is also supplied to the laser diode. The pulsed current $I_p$ is superimposed over the bias current Ib, and the resultant current is supplied to the laser diode.

The APC 16 monitors a power of the light output by the laser diode. The APC 16 supplies the pulsed-current control signal to the driving unit 13 and supplies a bias-current control signal to the laser diode in accordance with the monitored power. This control procedure is carried out by the APC 16 so as to control the power of the light output by the laser diode to be constant.

The ATC 15 includes a Peltier device (not shown in FIG. 1) which is capable of controlling the temperature of the laser diode included in the LD MOD 14. The ATC 15 controls the Peltier device so that the temperature of the laser diode is controlled to be constant.

FIGS. 2A and 2B show the laser diode module 14 of the conventional optical transmitter 10 in FIG. 1. In FIGS. 2A and 2B, the laser diode module 14 includes a case 17 which hermetically seals the laser diode. A Peltier device 23 is attached to a bottom portion of the case 17. A metal base 19 is attached to a top surface of the Peltier device 23.

A photodetector (PD) 20, a chip carrier 21, and a thermistor 25 are arranged on a top surface of the metal base 19. A laser diode chip 26 is placed on the chip carrier 21. The photodetector 20 monitors a power of the light output by the laser diode chip 26. The thermistor 25 detects a temperature of a peripheral portion of the laser diode chip 26. The detected temperature from the thermistor 25 is used by the Peltier device 23 to control a temperature of the laser diode chip 26 to be constant.

In addition, in the laser diode module 14, an optical unit 22 including a lens and an isolator is arranged between the laser diode chip 26 and an optical fiber line 24. This optical fiber line 24 serves as an optical transmission line through which the light signal from the laser diode module 14 is transmitted. Further, in the laser diode module 14, a number of connection terminals 18 are arranged on the periphery of the case 17. The connection terminals 18 of the laser diode module 14 are connected to the driving unit 13, the automatic temperature control unit 15, and the automatic power control unit 16 which are shown in FIG. 1.

FIG. 3 shows an output portion of the driving unit 13 and the laser diode module (LD MOD) 14 in the conventional optical transmitter 10 in FIG. 1.

In FIG. 3, the laser diode module 14 includes a laser diode LD, a photodetector PD which is the photodetector 20 in FIGS. 2A and 2B, and a damping resistor Rd. A source power line of a source voltage Vcc (the actuated voltage level) is connected to an anode of the laser diode LD. One end of the damping resistor Rd is connected to a cathode of the laser diode LD. The damping resistor Rd is provided to shape a waveform of the light signal and reduce an interference of data of the light signal when the data transmission rate is higher than a gigabit per second.

The light signal from the laser diode LD is output to the optical fiber line 24 via the optical unit 22 (not shown in FIG. 3). The source power line of Vcc is connected to a cathode of the photodetector PD. The photodetector PD detects a power of the light output by the laser diode LD, and supplies a light-output detection signal to the automatic power control unit 16 (shown in FIG. 1) in accordance with the detected power.

In FIG. 3, the output portion of the driving unit 13 includes two transistors TR1 and TR2 which constitute a differential amplifier, and a transistor TR3 and a resistor R1 which constitute a constant-current source. The input signal which indicates a complementary form of data is supplied to each of bases of the transistors TR1 and TR2. The source voltage Vcc (which is, for example, +5 V) from the source power line of Vcc is supplied to a collector of the transistor TR1. A collector of the transistor TR2 is connected to the other end of the damping resistor Rd in the laser diode module 14.

A collector of the transistor TR3 is connected to each of emitters of the transistors TR1 and TR2. The pulsed-current control signal from the APC 16 shown in FIG. 1 is supplied to a base of the transistor TR3. This pulsed-current control signal is a voltage signal which sets a voltage of the base of the transistor TR3. By setting the voltage of the base of the transistor TR3, the pulsed current flowing in the transistor TR3, which is the same as that supplied to the laser diode LD, is controlled. A source power line of a source voltage Vee (the ground level) is connected to an emitter of the transistor TR3 via the resistor R1. The ground-level voltage Vee from the source power line is always lower than the actuated-level voltage Vcc from the source power line.

To supply the bias current Ib, which is equivalent to the threshold current of the laser diode LD, to the laser diode LD, a transistor TR4, an inductor L1, and a resistor R2 are provided in the circuit shown in FIG. 3. A collector of the transistor TR4 is connected to the above-mentioned other end of the damping resistor Rd via the inductor L1 and to the collector of the transistor TR2 via the inductor L1. An emitter of the transistor TR4 is connected to the source power line of Vee via the resistor R2. The bias-current control signal from the APC 16 shown in FIG. 1 is supplied to a base of the transistor TR4. This bias-current control signal is a voltage signal which sets a voltage of the base of the transistor TR4.

FIG. 4 shows an operation of the circuit of the conventional optical transmitter 10 in FIG. 3. In FIG. 4, the abscissa of each chart indicates the input current flowing in the laser diode LD, and the ordinate thereof indicates the power of the light output by the laser diode LD. The threshold current of the laser diode LD is indicated by "Ith" in FIG. 4. In FIG. 4, there are shown some input-output characteristic lines of the laser diode LD with different rates of change of the quantum efficiency which are varied depending on the temperature of the laser diode LD. The bias current $I_b$ is the same as the threshold current "Ith", and the pulsed current $I_p$ is superimposed over the bias current Ib. The amplitude of the pulsed current $I_p$ is set so that the power of the light output follows a corresponding temperature characteristic line.

As shown in FIG. 4, when the temperature of the laser diode LD rises, the threshold current "Ith" increases and the rate of change of the quantum efficiency decreases. The power of the light output by the laser diode is varied depending on the change in the temperature of the laser diode. In other words, when the temperature of the laser diode LD rises, both the bias current $I_b$ and the pulsed current $I_p$ are increased, and the power of the light output by the laser diode is increased.

In order to avoid the increase of the power of the light output by the laser diode, the temperature of the laser diode LD is controlled to be constant by using the Peltier device 23 in the conventional transmitter. In other words, in the conventional transmitter, the temperature of the peripheral portion of the laser diode chip 26 is measured by using the thermistor 25. The measured temperature is used by the ATC 15 to control the Peltier device 23, thereby controlling the temperature of the laser diode LD to be unchanged. Thus, the occurrence of the undesired input-output characteristic of the laser diode is prevented.

Although the temperature of the laser diode can be controlled to be constant by using the Peltier device 23, there is a problem that the laser diode module 14 including the Peltier device 23 becomes large in size, and the automatic temperature control unit 15 of the optical transmitter requires a large amount of additional power for the temperature control operation. Therefore, it is desirable that the size of the optical transmitter be made smaller and the consumption power of the optical transmitter be reduced as much as reasonably possible. It is conceivable to eliminate the Peltier device 23 and the automatic temperature control unit 15 from the optical transmitter, in order to resolve the above problem.

However, if an optical transmitter in which only the Peltier device is eliminated is used, the output of the transistor TR2 of the output portion of the driving unit 13 may be saturated when the temperature of the laser diode rises. The switching of the transistor TR2 in response to the input signal cannot be performed, and it is difficult to correctly supply the pulsed current to the laser diode.

SUMMARY OF THE INVENTION

An object of the present invention to provide an improved optical transmitter in which the above-described problem is eliminated.

Another object of the present invention is to provide an optical transmitter in which no Peltier device is used and the outputting of the light signal is controlled to be stable and constant even when the temperature of the laser diode changes.

Still another object of the present invention is to provide a laser diode module in which no Peltier device is used and the outputting of the light signal is controlled to be stable and constant even when the temperature of the laser diode changes.

The above-mentioned objects of the present invention are achieved by an optical transmitter which includes: a laser diode module including a laser diode which outputs a light signal to an optical transmission line; a driving unit for driving the laser diode in accordance with an input signal indicative of data to be transmitted; and a coupling unit for connecting an output of the driving unit to an input of the laser diode module, the coupling unit allowing an alternating current to flow through the laser diode and inhibiting the output of the driving unit from being subjected to a direct current from the laser diode module.

The above-mentioned objects of the present invention are achieved by a laser diode module which includes: a laser diode; a case for hermetically sealing the laser diode; a photodetector for detecting a power of a light output by the laser diode; a supporting base, provided within the case, for supporting the laser diode and the photodetector; connection terminals for connecting the laser diode and the photodetector to an external unit; and an optical unit, provided within the case, through which the light signal output by the laser diode is transmitted to an optical transmission line, wherein the laser diode module includes no element which controls a temperature of the laser diode to be constant.

According to the present invention, it is possible to prevent the saturation of the transistor in the output portion of the driving unit due to a change in the temperature of the laser diode even if no Peltier device is used in the optical transmitter. Also, it is possible to provide an optical transmitter which is reasonably small in size and requires a small amount of power for the operation because it uses neither the Peltier device nor the temperature control unit. Further, it is possible to provide a laser diode module which is reasonably small in size and requires a small amount of power for the operation because it uses neither the Peltier device nor the temperature control unit.

BRIEF DESCRIPTION OF THE DRAWINGS

Other objects, features and advantages of the present invention will be more apparent from the following detailed description when read in conjunction with the accompanying drawings in which:

FIGS. 7A and 7B are top and side views of a laser diode module of the optical transmitter in FIG. 5;

FIG. 8 is a chart for explaining an offset current which is needed during an operation of the circuit in FIG. 6;

FIGS. 21A through 21H are charts for explaining an operation of the circuit in FIG. 20;

DESCRIPTION OF THE PREFERRED EMBODIMENTS

A description will now be given of various preferred embodiments of the present invention.

Figure 1:
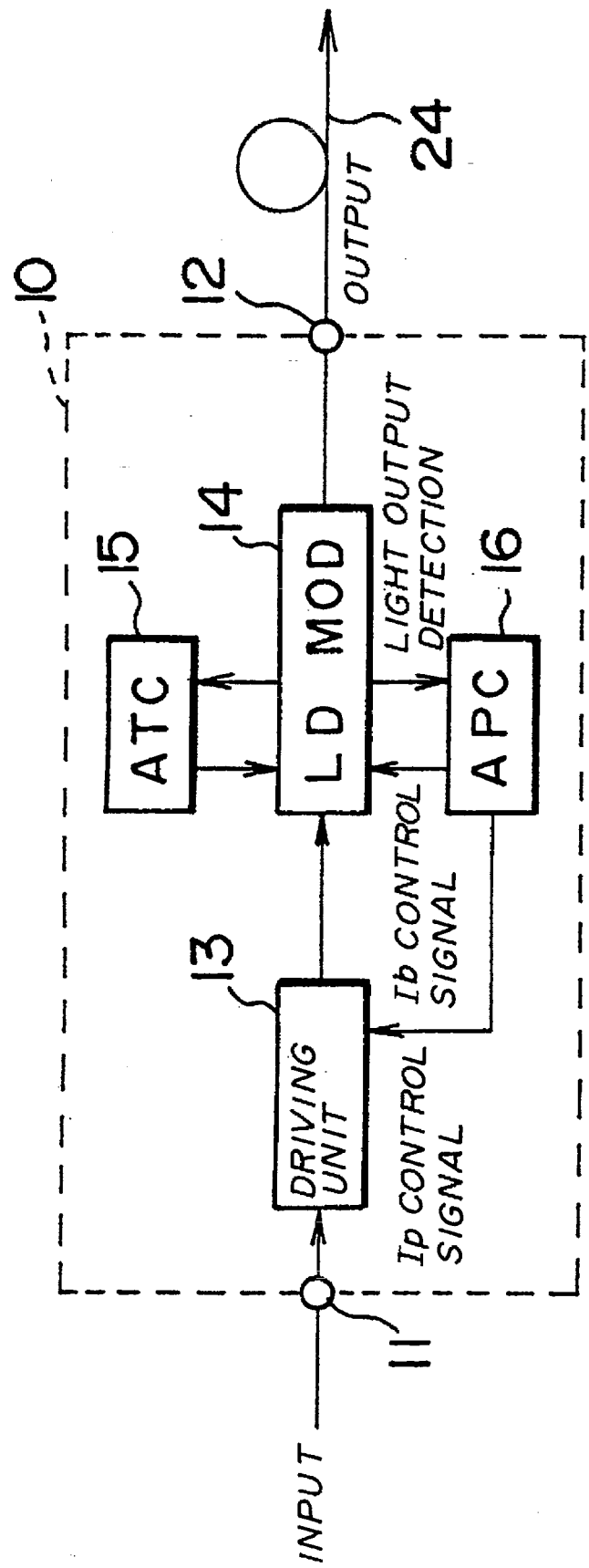
FIG. 1 is a block diagram of a conventional optical transmitter.
Figure 5:
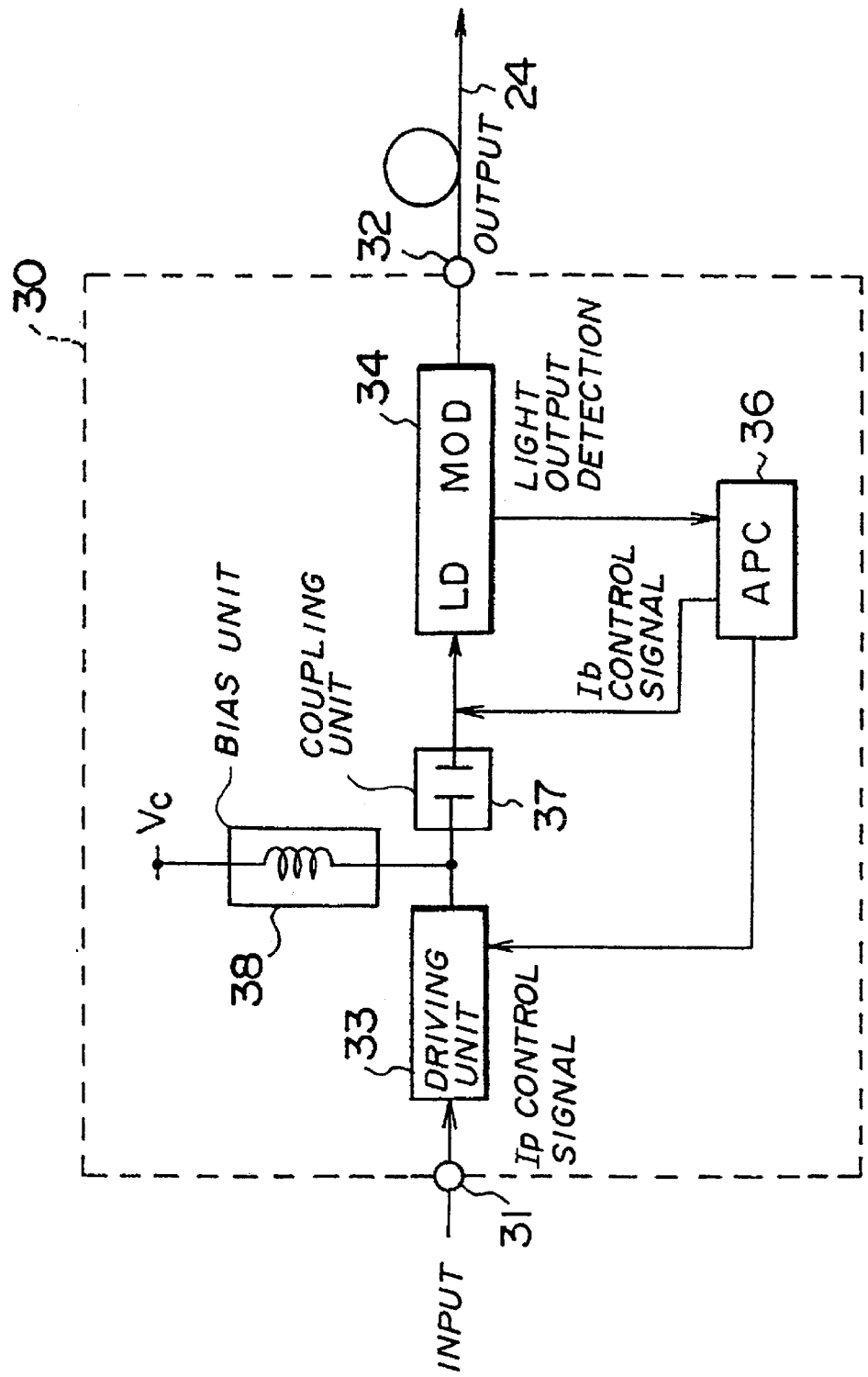
FIG. 5 is a block diagram of an optical transmitter in one embodiment of the present invention.

FIG. 5 shows an optical transmitter 30 in one embodiment of the present invention. In FIG. 5, the optical transmitter 30 comprises a driving unit 33, a laser diode module (LD MOD) 34, and an automatic power control circuit (APC) 36. These elements of the optical transmitter 30 are substantially the same as corresponding elements of the conventional optical transmitter 10 in FIG. 1.

In FIG. 5, the optical transmitter 30 includes a coupling unit 37 which connects an output of the driving unit 33 to an input of the laser diode module 34. The coupling unit 37 comprises a capacitive element Which is, for example, a capacitor. The coupling unit 37 allows an alternating current to flow through the driving unit 33 and the laser diode module 34 and inhibits the output of the driving unit 33 from being influenced by a direct current from the laser diode module 34.

The optical transmitter 30 further includes a bias unit 38 which is connected to the output of the driving unit 33. A source voltage line of a predetermined bias voltage Vc is connected to the bias unit 38, and the bias unit 38 supplies a bias current (d.c.) to the output of the driving unit 33 to enable a switching operation of a transistor of an output portion of the driving unit 33.

To supply the bias current to the output of the driving unit 33, it is necessary that the bias voltage Vc be higher than the ground-level voltage Vee and not higher than the actuated-level voltage Vcc. In this embodiment, the bias voltage Vc is set equal the actuated-level voltage Vcc.

The bias unit 38 comprises an inductive element which is, for example, an inductor. It is necessary to inhibit the bias unit 38 from being influenced by an alternating current flowing between the output of the driving unit 33 and the input of the laser diode module 34. Thus, the bias unit 38 includes the inductive element, and the bias unit 38 is separated from the ac connection between the driving unit 33 and the laser diode module 34.

Figure 3:
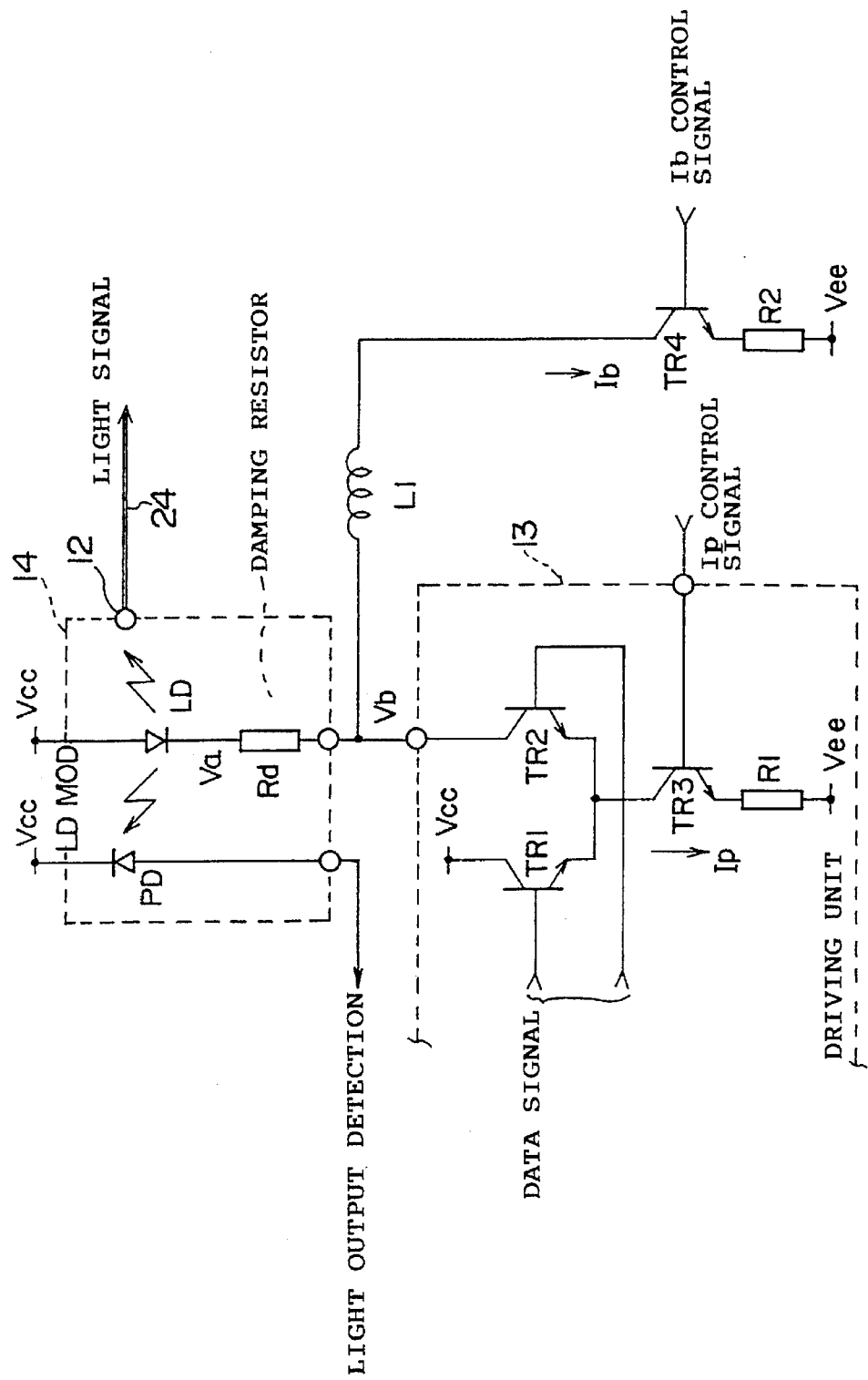
FIG. 3 is a circuit diagram showing a circuit of the conventional optical transmitter in FIG. 1.
Figure 4:
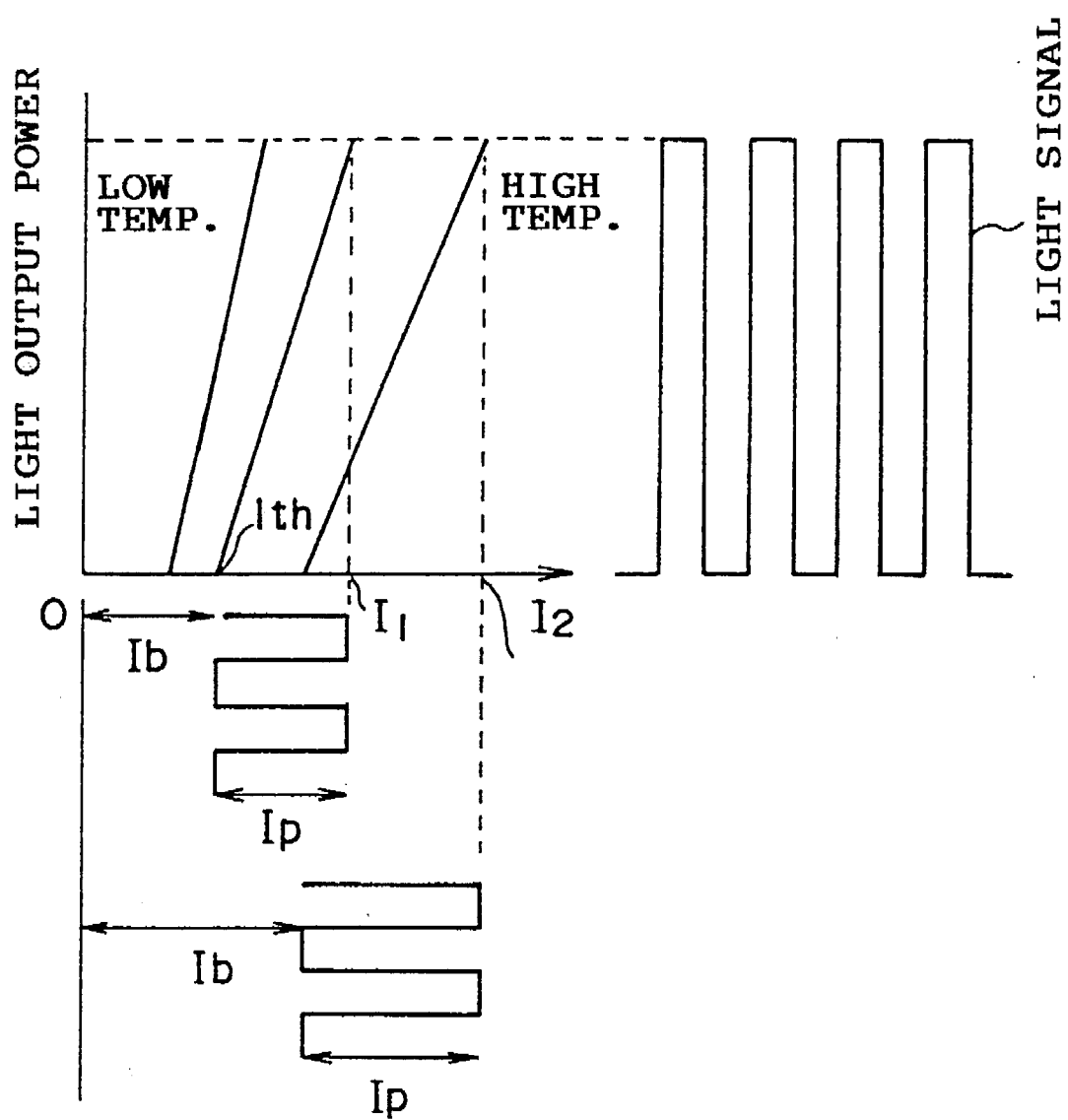
FIG. 4 is a chart for explaining an operation of the circuit in FIG. 3.
Figure 6:
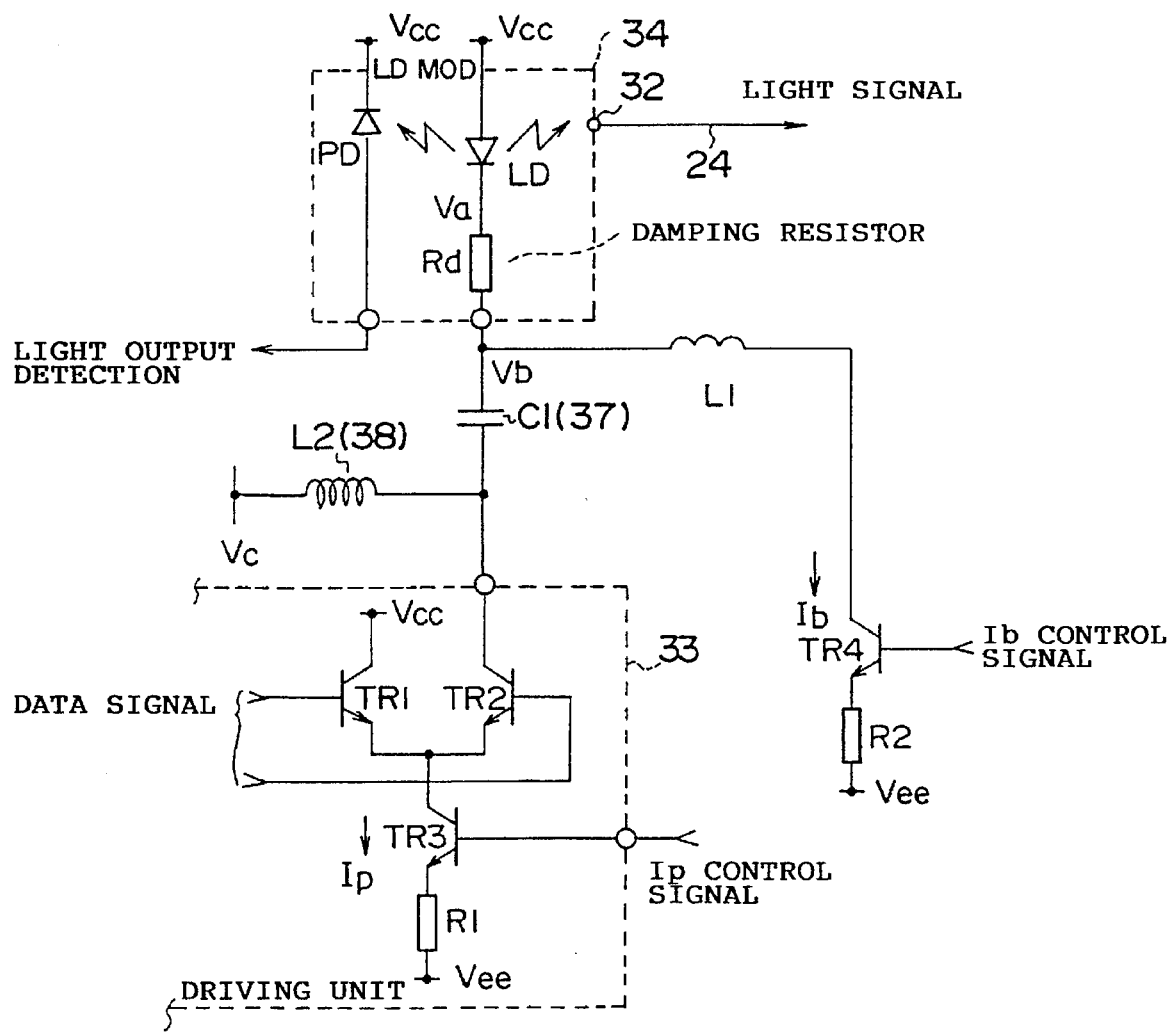
FIG. 6 is a circuit diagram of a circuit of the optical transmitter in FIG. 5.

FIG. 6 shows a detailed structure of a circuit of the optical transmitter in FIG. 5. In FIG. 6, the elements which are the same as corresponding elements in FIG. 3 are designated by the same reference numerals.

In the circuit shown in FIG. 6, a capacitor C1 constitutes the coupling unit 37 and an inductor L2 constitutes the bias unit 38. One end of the capacitor C1 is connected to the terminal of the damping resistor Rd in the laser diode module 34. The other end of the capacitor C1 is connected to the collector of the transistor TR2 in the driving unit 33.

One end of the inductor L2 is connected to the source voltage line of the predetermined bias voltage Vc, and the other end of the inductor L2 is connected to the collector of the transistor TR2 in the driving unit 33 and to the above-mentioned other end of the capacitor C1.

The capacitor C1 inhibits the output of the driving unit 33 from being influenced by a direct current from the laser diode module 34. Thus, a potential of the collector of the transistor TR2 is not influenced by the potential Vb of the input of the laser diode module 34. The bias voltage Vc from the source voltage line is supplied to the output of the driving unit 33 through the inductor L2. The pulsed current $I_p$, produced by the bias voltage Vc, flows through the driving unit 33 and the laser diode module 34 in accordance with the ON/OFF of the transistor TR3.

In the laser diode module 34, the photodetector PD outputs a light-output detection signal in accordance with the power of the light output by the laser diode LD. This light-output detection signal is supplied to the automatic power control unit (APC) 36.

As shown in FIGS. 5 and 6, in response to the light-output detection signal, the APC 36 supplies a pulsed-current ($I_p$) control signal to the base of the transistor TR3 in the driving unit 33 and supplies a bias-current ($I_b$) control signal to the base of the transistor TR4 to control the power of the light output by the laser diode LD to be constant.

As the temperature of the laser diode LD rises, the power of the light output by the laser diode LD when the same current is supplied thereto decreases. In order to avoid this decrease of the power of the light output the APC 36 controls the amplitudes of the $I_p$ control signal and the $I_b$ control signal. Thus, if the temperature of the laser diode LD rises, the APC 36 increases the amplitude of the $I_p$ control signal supplied to the transistor TR3 and increases the amplitude of the $I_b$ control signal supplied to the transistor TR4, so that the pulsed current $I_p$ and the base current $I_b$, which flow through the driving unit 33, are increased.

Thus, in the above embodiment, no Peltier device is used and the output of the light signal from the laser diode LD is controlled to be stable and constant even when the temperature of the laser diode changes. In the above embodiment, because of the use of the capacitor C1, the potential of the collector of the transistor TR2 in the output portion of the driving unit 33 is not influenced by a direct current from the laser diode module 34. Therefore, it is possible to prevent the saturation of the transistor TR2 which may take place when no Peltier device is used.

Figure 2A:
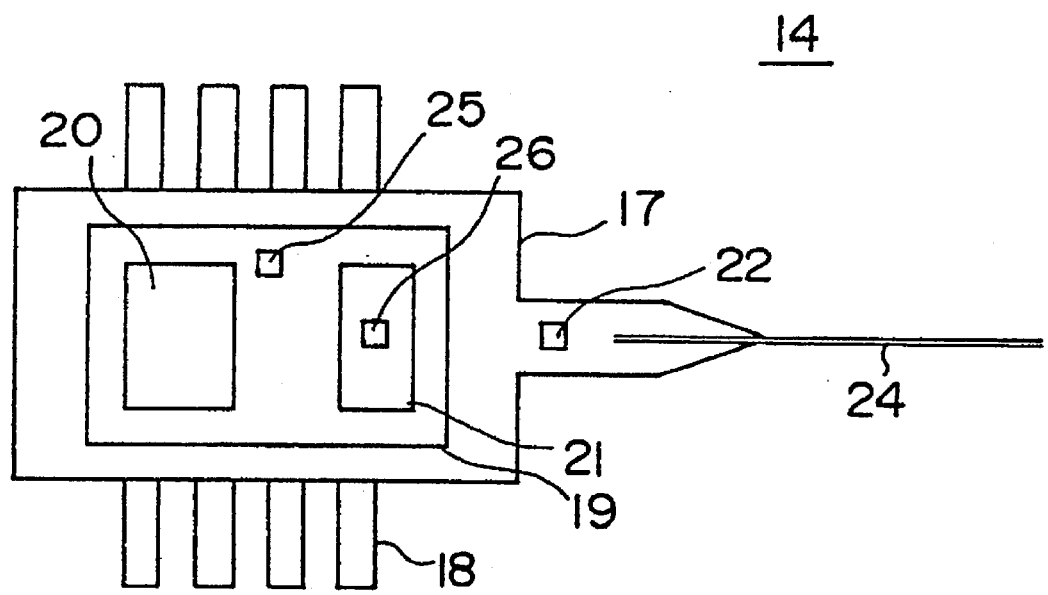
FIGS. 2A and 2B are top and side views of a laser diode module of the conventional optical transmitter in FIG. 1.
Figure 2B:
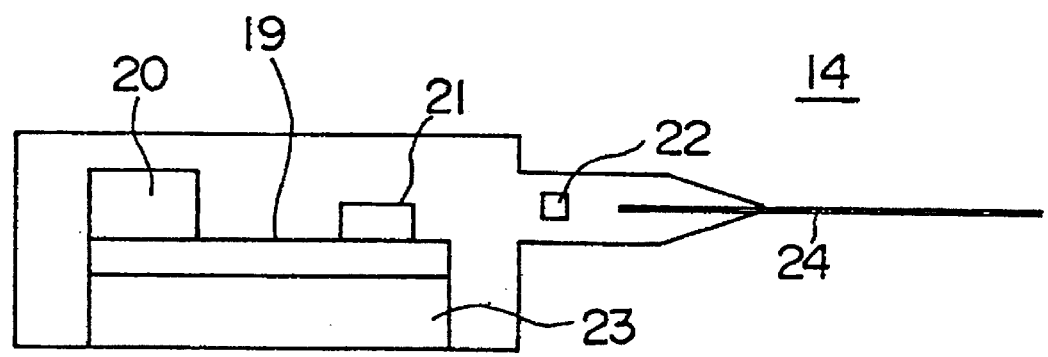

FIGS. 7A and 7B show the laser diode module 34 of the optical transmitter 30 in FIG. 5. In FIGS. 7A and 7B, the elements which are the same as corresponding elements in FIGS. 2A and 2B are designated by the same reference numerals.

As shown in FIGS. 7A and 7B, the laser diode module 34 in the above embodiment can be built with a reduced size because no Peltier device is used. Especially, a height of this laser diode module 34 is smaller than a height of the conventional laser diode module 14 in FIGS. 2A and 2B.

The laser diode module 34 includes a case 39 which hermetically seals the laser diode. No Peltier device is attached to the case 39. A supporting base 138 is provided to support the case 39, and the photodetector (PD) 20 and the chip carrier 21 on which the laser diode chip 26 is placed are arranged on the supporting base 138. No thermistor is provided on the supporting base 138.

In addition, in the laser diode module 34, the optical unit 22 including a lens and an isolator is arranged between the laser diode chip 26 and the optical fiber line 24. This optical fiber line 24 serves as the optical transmission line through which the light signal from the laser diode module 34 is transmitted. No automatic temperature control unit (ATP) is arranged. Further, the connection terminals 18 are arranged on the peripheral portions of the case 39. The connection terminals 18 of the laser diode module 34 are connected to the driving unit 13 and the automatic power control unit 16 which are shown in FIG. 5.

Neither the Peltier device 23 nor the ATC 15 is included in the laser diode module 34, and it is possible to remarkably reduce the amount of the power required to operate the laser diode module 34.

Because the output of the driving unit 33 is connected to the input of the laser diode module 34 by the capacitor C1 in the above embodiment in FIG. 6, the direct-current component in the pulsed current $I_p$ flowing in the laser diode LD is lost. If the bias current $I_b$ is added to the pulsed current $I_p$, the amplitude of the pulsed current $I_p$ will deviate from the desired input-output characteristic line. Therefore, in order for the amplitude of the pulsed current $I_p$ to match the temperature characteristic, it is necessary to compensate for the direct-current component in the pulsed current $I_p$ which has been lost due to the capacitor C1.

In order to compensate for the direct-current component, an offset current $I_{boff}$ which is equivalent to the direct-current component of the pulsed current $I_p$ is added to the bias current $I_b$ so that the amplitude of the pulsed current $I_p$ is centered at the middle point of the input-output characteristic line. This is shown in FIG. 8 as an example. In the example of FIG. 8, the amplitude of the offset current $I_{boff}$ is equal to half the amplitude of the pulsed current $I_p$.

Figure 9:
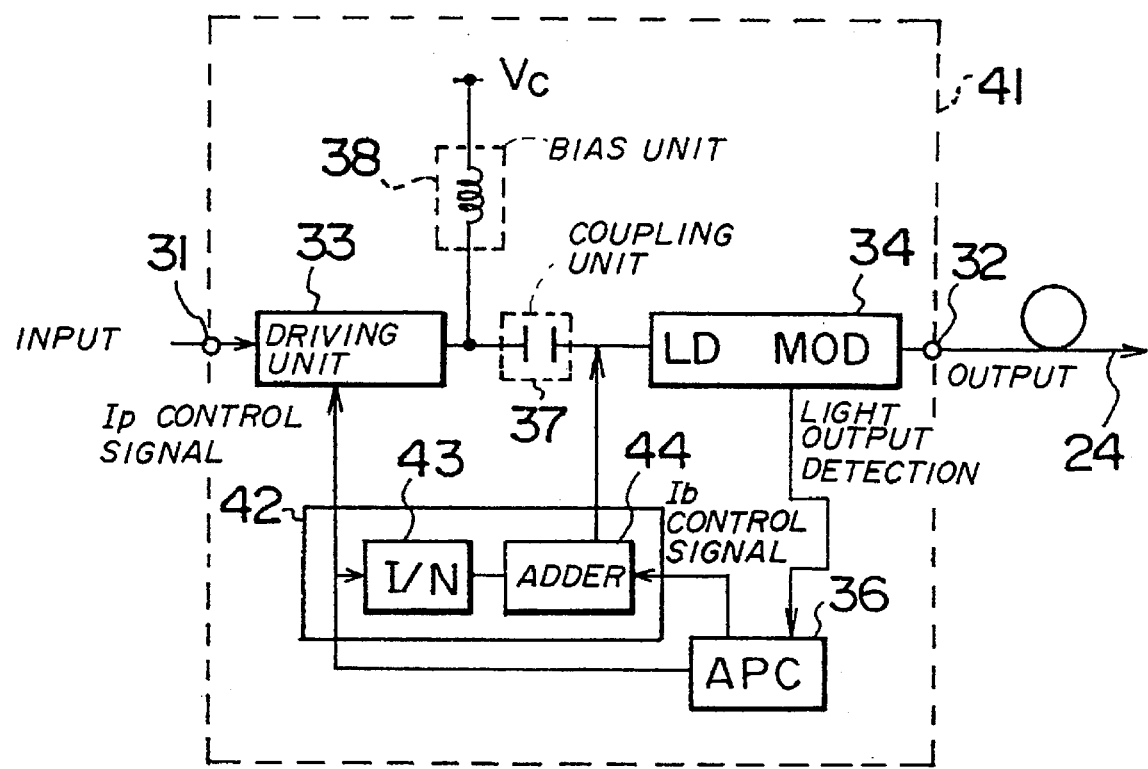
FIG. 9 is a block diagram of an optical transmitter in another embodiment of the present invention which includes a direct-current supplying unit.

FIG. 9 shows an optical transmitter 41 in another embodiment of the present invention in which adding the offset current described above is taken into account. In FIG. 9, the elements which are the same as corresponding elements in FIG. 5 are designated by the same reference numerals.

The optical transmitter 41 in FIG. 9 includes a direct-current supplying unit 42 which supplies a direct current of $I_b+I_{boff}$ to the input of the laser diode module 34. The direct-current supplying unit 42 includes a voltage divider (1/N) 43 and an adder 44, where N is an arbitrary number which is greater than one.

In the direct-current supplying unit 42, the pulsed-current control signal from the APC 36 is supplied to the voltage divider 43. The voltage divider 43 outputs to one input of the adder 44 a signal of 1/N times the pulsed-current control signal. That is, the amplitude of the signal, output by the voltage divider 43 to the adder 44, is equivalent to 1/N times the amplitude of the pulsed current $I_p$, and this signal is equivalent to the offset signal $I_{boff}$ mentioned above. The bias-current control signal from the APC 36 is supplied to the other input of the adder 44. Thus, the resulting signal from the adder 44 is supplied to the input of the laser diode module 34, and this signal indicates a sum of the bias current $I_b$ from the APC 36 and the offset current 1/N.$I_p$ from the voltage divider 43.

Figure 10:
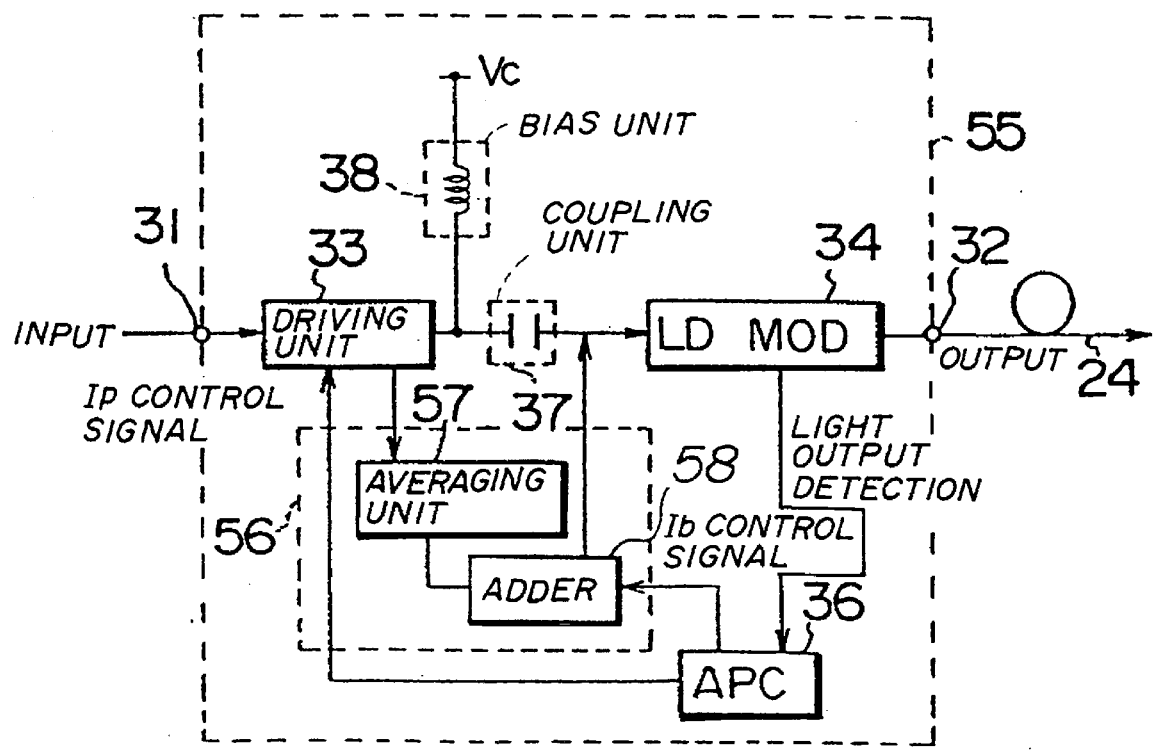
FIG. 10 is a block diagram of an optical transmitter in still another embodiment of the present invention which includes a different direct-current supplying unit.

FIG. 10 shows an optical transmitter 55 in still another embodiment of the present invention including a direct-current supplying unit 56 which is different from the direct-current supplying unit 42 in FIG. 9. In FIG. 10, the elements which are the same as corresponding elements in FIG. 5 are designated by the same reference numerals.

In FIG. 10, the optical transmitter 55 includes the direct-current supplying unit 56 which supplies a direct current of $I_b+I_{boff}$ to the input of the laser diode module 34. In the embodiment in FIG. 9, the offset current $I_{boff}$ is set at an amplitude equal to the amplitude of the pulsed current $I_p$. In the embodiment in FIG. 10, the offset current $I_{boff}$ is set to be equal to an average of the pulsed current $I_p$ flowing in the driving unit 33.

More specifically, the direct-current supplying unit 56 in FIG. 10 includes an averaging unit 57 and an adder 58. The averaging unit 57 determines an average of the pulsed current $I_p$ flowing in the driving unit 33, and outputs a signal of the determined average to one input of the adder 58. This signal is equivalent to the offset current $I_{boff}$ mentioned above. The bias-current control signal from the APC 36 is supplied to the other input of the adder 44. Thus, the resulting signal from the adder 44 is supplied to the input of the laser diode module 34, and this signal indicates a sum of the bias current $I_b$ from the APC 36 and the offset current $I_{boff}$ (the average signal) from the averaging unit 57.

Figure 11:
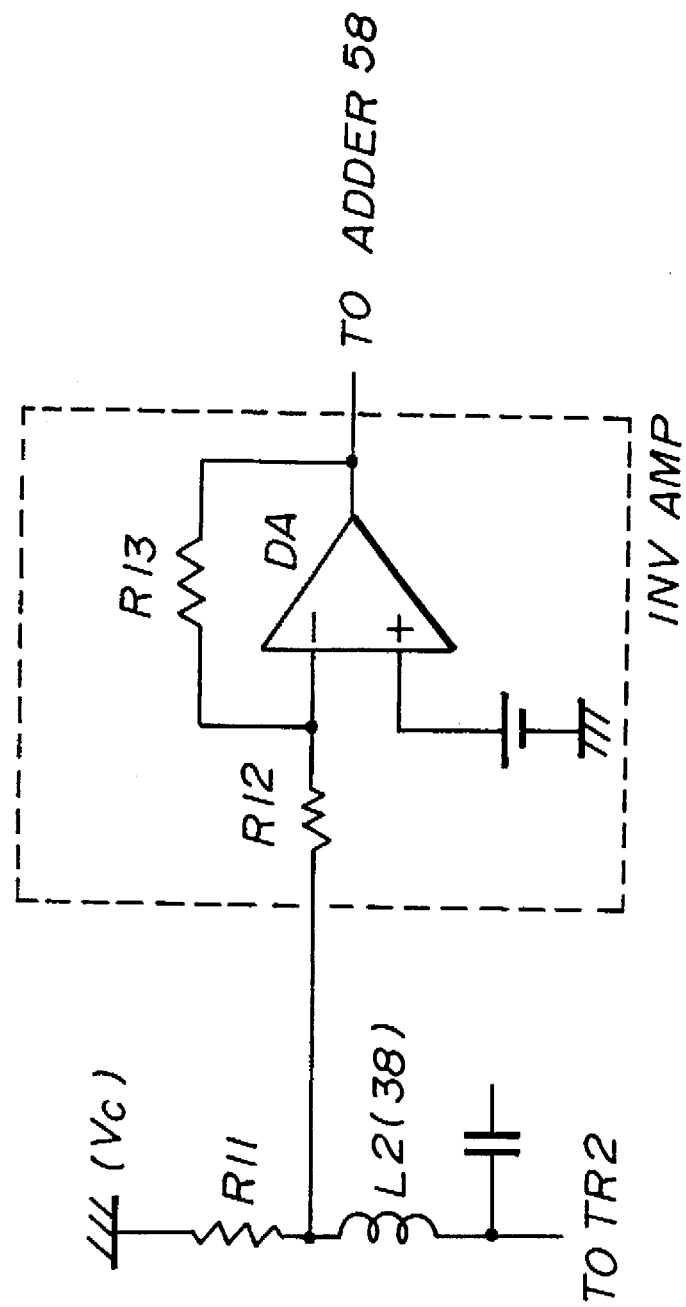
FIG. 11 is a circuit diagram of an averaging unit of the optical transmitter in FIG. 10.

FIG. 11 shows the averaging unit 57 of the optical transmitter in FIG. 10. In FIG. 11, the averaging unit 57 includes a resistor R11 and an inverting amplifier unit (INV AMP). One end of the inductor L2 in the bias unit 38 (shown in FIG. 6) is connected to the collector of the transistor TR2 in the driving unit 33 (shown in FIG. 6), and the other end of the inductor L2 is connected to the input of the adder 58 (shown in FIG. 10) through the inverting amplifier unit (INV AMP). One end of the resistor R11 is connected to the above-mentioned other end of the inductor L2, and the other end of the resistor R11 is connected to the line of the bias voltage Vc. The inverting amplifier unit includes resistors R12 and R13, a differential amplifier DA, and a power supply which outputs a reference voltage applied to a positive input of the differential amplifier DA.

Figure 12:
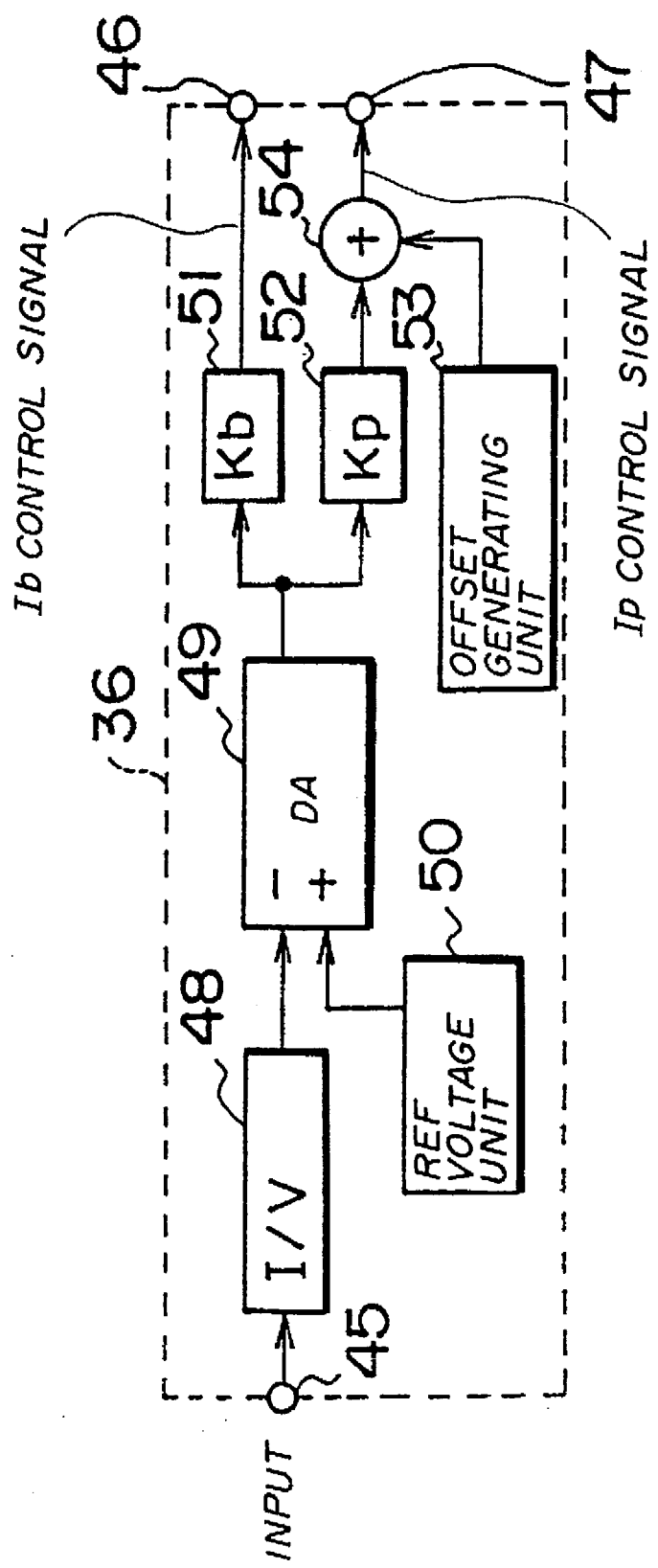
FIG. 12 is a block diagram of an automatic power control unit for each of the optical transmitters in FIGS. 5, 9, and 10.

FIG. 12 shows the automatic power control unit (APC) 36 for each of the optical transmitters in FIGS. 5, 9, and 10. In FIG. 12, the automatic power control unit (APC) 36 is substantially the same as the automatic power control unit (APC) 16 of the conventional optical transmitter in FIG. 1.

More specifically, the APC 36 includes a current/voltage converter 48 (I/V), a differential amplifier 49 (DA), a reference voltage unit 50, fixed gain units 51 (Kb) and 52 (Kp), an offset generating unit 53, and an adder 54.

A current signal (the light-output detection signal) from the photodetector PD (shown in FIG. 6) is supplied to an input 45 of the APC 36. The current/voltage (I/V) converter 48 converts this current signal into a voltage signal. At the differential amplifier 49, the voltage signal from the I/V converter 48 is compared with a reference voltage from the reference voltage unit 50. The differential amplifier 49 outputs a difference voltage as a result of the comparison. The reference voltage from the reference voltage unit 50 corresponds to the average power of the light output by the laser diode LD.

The difference voltage is multiplied by "Kb" (where Kb is an arbitrary coefficient) at the fixed gain unit 51, and the resulting signal is transferred as the bias-current control signal from an output 46 of the APC 36. The difference voltage is multiplied by "Kp" (where Kp is an arbitrary coefficient) at the fixed gain unit 52, and the resulting signal is transferred to one input of the adder 54. An offset voltage from the offset generating unit 53 is transferred to the other input of the adder 54. Thus, a voltage signal, which indicates a sum of the voltage signal from the fixed gain unit 52 and the offset voltage signal from the offset generating unit 53, is transferred as the pulsed-current control signal from an output 47 of the APC 36.

When the temperature of the laser diode LD rises, the power of the light output by the laser diode is reduced. As the difference voltage output by the differential amplifier 49 is increased at this time, the voltage of each of the bias-current control signal and the pulsed-current control signal, output by the APC 36, is increased. The base voltage of each of the transistors TR3 and TR4, shown in FIG. 6, is increased accordingly. Therefore, in response to the rise of the temperature of the laser diode LD, an increased amount of the pulsed current Ip and an increased amount of the bias current Ib flows through the transistor TR3 and the transistor TR4, respectively. The power of the light output by the laser diode is thus increased in response to the rise of the temperature of the laser diode, and it is possible to control the power of the light output by the laser diode to be in accordance with the change in the temperature of the laser diode.

Figure 13:
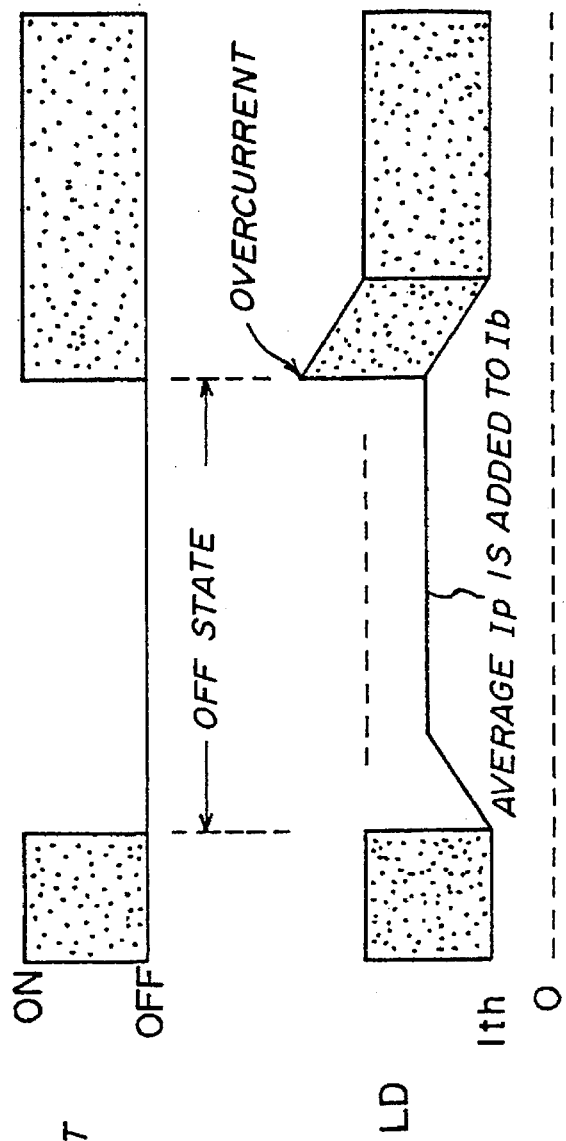
FIGS. 13A and 13B are charts for explaining an overcurrent which may flow in the laser diode.

FIGS. 13A and 13B show an overcurrent which may flow in the laser diode during an operation of the optical transmitter including the coupling unit 37.

As shown in FIG. 13A, when the input signal transferred to the driving unit 33 is in an "off" state (e.g., inputting zeros consecutively), no current flows from the output of the driving unit 33. Hereinafter, the "off" state of the input signal is a state in which the input signal continues to be unchanged for a certain period of time (e.g., for some milliseconds).

When the input signal is in the "off" state, the transistor TR2 is turned OFF, no pulsed current $I_p$ flows from the output of the driving unit 33. The capacitor C1 is charged at this time, and a current produced by the discharging of the capacitor C1 is added to the bias current $I_b$ (=Ith). As shown in FIG. 13B, at this time, the average amplitude of the pulsed current $I_p$ is added to the bias current $I_b$ due the discharging of the capacitor C1 and the laser diode is biased by the resulting current. The power of the light output by the laser diode is varied in accordance with the resulting current.

When the input signal transferred to the driving unit 33 is changed from the "off" state to an "on" state, the pulsed current $I_p$ flows again through the laser diode. At this time, this pulsed current is added to the previous current. Thus, as shown in FIG. 13B, an overcurrent (which is about 1.5 times the current in the normal case) flows through the laser diode. This may damage or deteriorate the laser diode chip 26. Accordingly, it is desirable that the occurrence of the above overcurrent is prevented.

Figure 14:
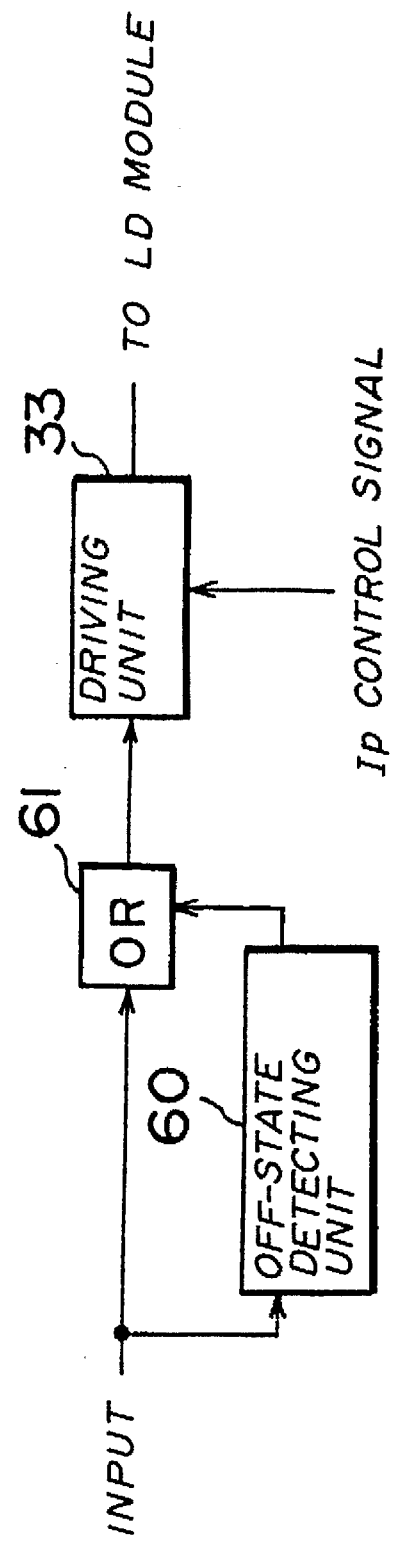
FIG. 14 is a block diagram of an optical transmitter in a further embodiment of the present invention which includes an overcurrent preventing unit.
Figure 15:
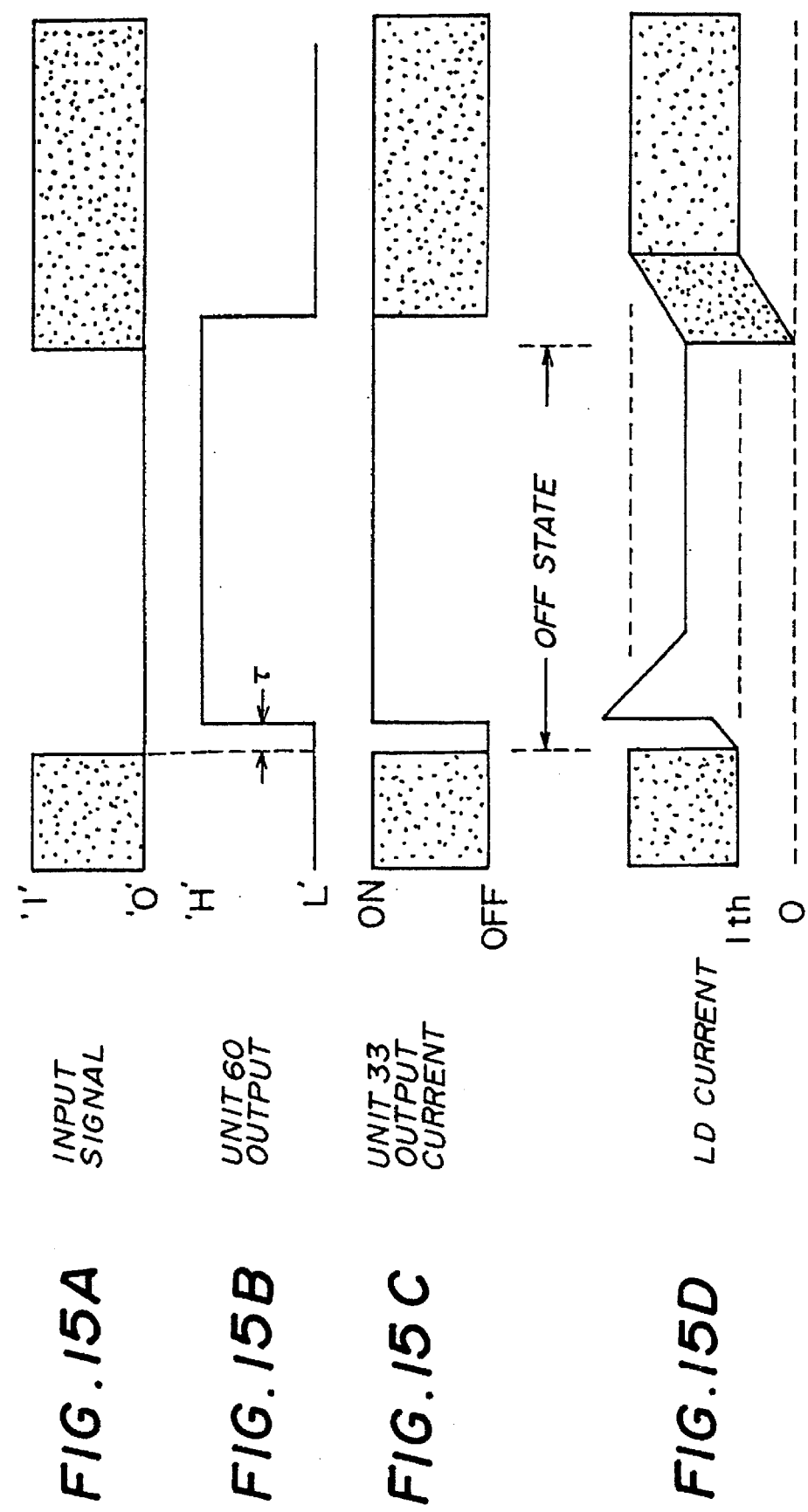
FIGS. 15A through 15D are charts for explaining an operation of the optical transmitter in FIG. 14.

FIG. 14 shows an optical transmitter in a further embodiment of the present invention which includes an overcurrent preventing unit. Although only a portion of this optical transmitter is shown in FIG. 14, the optical transmitter in this embodiment includes, in addition to all the above-described elements of the optical transmitter in FIG. 5, an off-state detecting unit 60 and an OR circuit 61 which are provided at the input of the driving unit 33. In this embodiment, the overcurrent preventing unit is constituted by the off-state detecting unit 60 and the OR circuit 61.

The off-state detecting unit 60 detects whether the input signal, present at the input of the optical transmitter, is continuously in the OFF state. For example, this detection is carried out by determining whether a time of consecutively receiving zeros by the optical transmitter exceeds a predetermined time period.

If the OFF state of the input signal is detected, the off-state detecting unit 60 outputs an ON signal indicating value one "1" (which is an off-state detection signal) to the OR circuit 61. Otherwise, the off-state detecting unit 60 outputs an OFF signal indicating value zero "0" to the OR circuit 61. When the off-state detection signal is output to the OR circuit 61, the transistor TR2 in the output portion of the driving unit 33 is turned ON.

FIGS. 15A through 15D show an operation of the optical transmitter in FIG. 14.

When the input signal is, as shown in FIG. 15A, changed to the OFF state, the time of consecutively receiving zeros exceeds a predetermined time period "τ". As shown in FIG.

15B, the off-state detecting unit 60 outputs the off-state detection signal, that is, the output signal of the off-state detecting unit 60 is changed from a low ("L") state to a high ("H") state. The off-state detection signal is supplied to the driving unit 33 via the OR circuit 61 in FIG. 14.

As shown in FIG. 15C, the driving unit 33 turns off the pulsed current $I_p$ immediately when the input signal is changed from "1" to "0", and turns it on in response to the off-state detection signal, to re-start the supply of the pulsed current $I_p$.

The current flows in the laser diode LD of the laser diode module 33 at this time, as shown in FIG. 15D. Immediately after the current flows in the output of the driving unit 33 by receiving the off-state detection signal, the large amount of the current instantaneously flows in the laser diode LD through the capacitor C1. This current is immediately reduced to an intermediate amount which is equal to the sum of the amount of the bias current $I_b$ (=Ith) and the average amount of the pulsed current $I_p$.

When the input signal is changed to the ON state again, the current flowing in the laser diode LD is reduced to be below the threshold current Ith and changed to the normal condition. During the OFF state of the input signal, the transistor TR2 is turned ON to supply a drive current (which is equivalent to the peak maximum of the pulsed current $I_p$) to the laser diode. Thus, when the supplying of the input signal to the optical transmitter is re-started, the transistor TR2 is turned OFF. Therefore, the current flowing in the laser diode LD is first reduced and then changed to the normal condition.

The amount of the current which flows through the laser diode immediately after the input signal is changed to the OFF state can be reduced by making the time period "τ" shorter.

Figure 16:
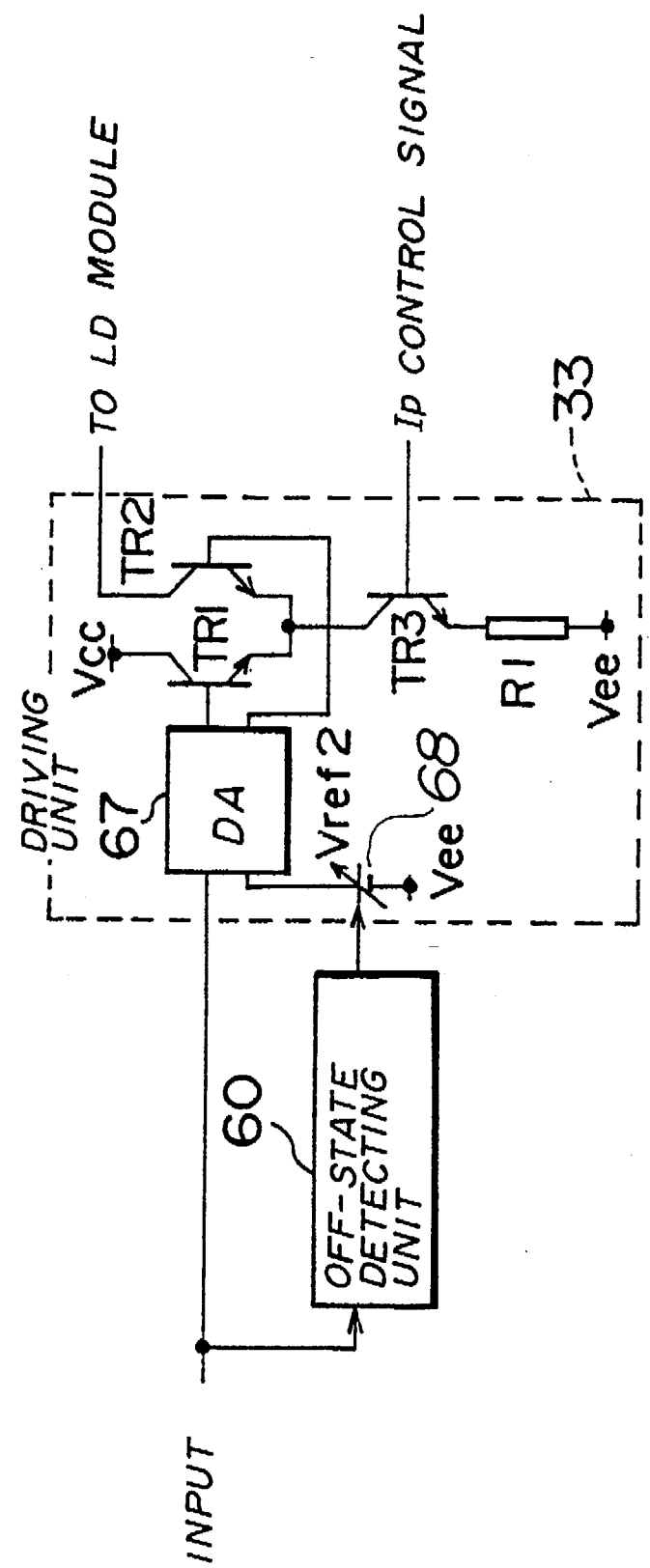
FIG. 16 is a block diagram of an optical transmitter in another embodiment of the present invention which includes a different overcurrent preventing unit.

FIG. 16 shows an optical transmitter in another embodiment of the present invention which includes a different overcurrent preventing unit. In FIG. 16, the elements which are the same as corresponding elements in FIG. 14 are designated by the same reference numerals.

Although only a portion of this optical transmitter is shown in FIG. 16, the optical transmitter in this embodiment includes, in addition to all the above-described elements of the optical transmitter in FIG. 5, the off-state detecting unit 60 and an input portion of the driving unit 33. The overcurrent preventing unit in this embodiment is constituted by the off-state detecting unit 60 and the input portion of the driving unit 33 which are shown in FIG. 16.

In FIG. 16, the off-state detection signal from the off-state detecting unit 60 is used to control a reference voltage of the input portion of the driving unit 33. In the input portion of the driving unit 33, as shown in FIG. 16, a differential amplifier 67 (DA) and a power supply 68 are provided. This power supply 68 supplies a reference voltage Vref2 to one input of the differential amplifier 67. The voltage of the input signal is compared with the reference voltage Vref2, and the differential amplifier 67 outputs a signal indicating the result of the comparison to the transistors TR1 and TR2. The switching operations of the transistors TR1 and TR2 are thus performed in accordance with the output signal of the DA 67. The voltage of the above off-state detection signal is predetermined to be below this reference voltage Vref2.

As shown in FIG. 15D, when the input signal is continuously in the OFF state, the large amount of the current which is much greater than the threshold current abruptly flows in the laser diode LD. The light output by the laser diode LD at this time is abruptly intensified to emit light. The light emitted by the laser diode LD at this time may cause any component of the optical transmitter to be damaged. To avoid this, it is desirable to stop the light output by the laser diode LD during the detection of the OFF state of the input signal.

Figure 17:
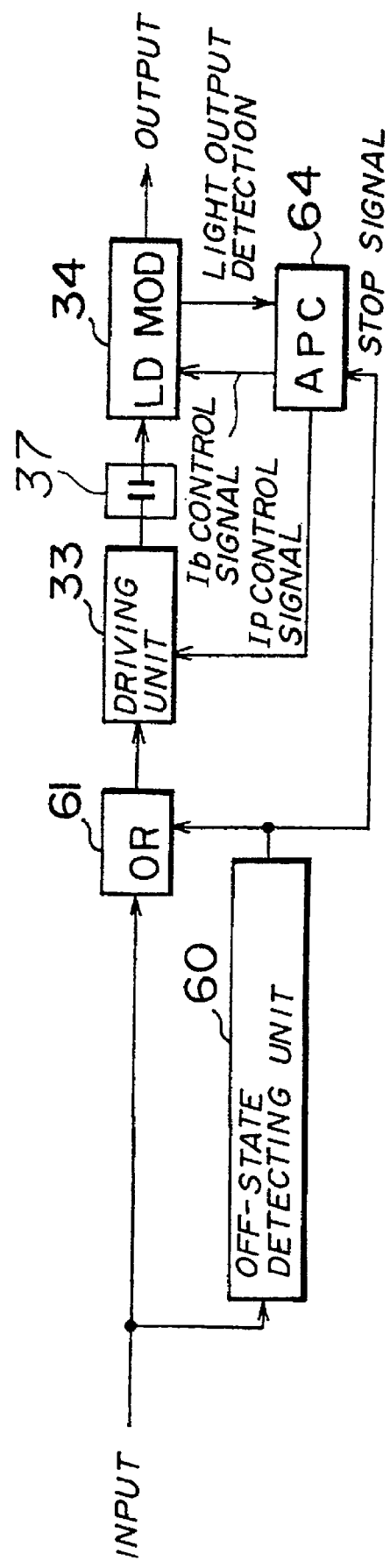
FIG. 17 is a block diagram of an optical transmitter in still another embodiment of the present invention which includes a light-output stopping unit.

FIG. 17 shows an optical transmitter in still another embodiment of the present invention which includes a light-output stopping unit. In FIG. 17, the elements which are the same as corresponding elements in FIG. 14 are designated by the same reference numerals. In FIG. 17, the off-state detection signal, output from the off-state detecting unit 60, is supplied to not only the OR circuit 61 but also the APC 64. At the APC 64, this off-state detection signal is received as a light-output stop signal. When the light-output stop signal from the off-state detecting unit 60 is received, the APC stops outputting the bias-current control signal to the laser diode module 34. In this embodiment, the light-output stopping unit is constituted by the off-state detecting unit 60 and the APC 64, which makes it possible to stop the light output by the laser diode LD during the detection of the OFF state of the input signal.

Figure 18:
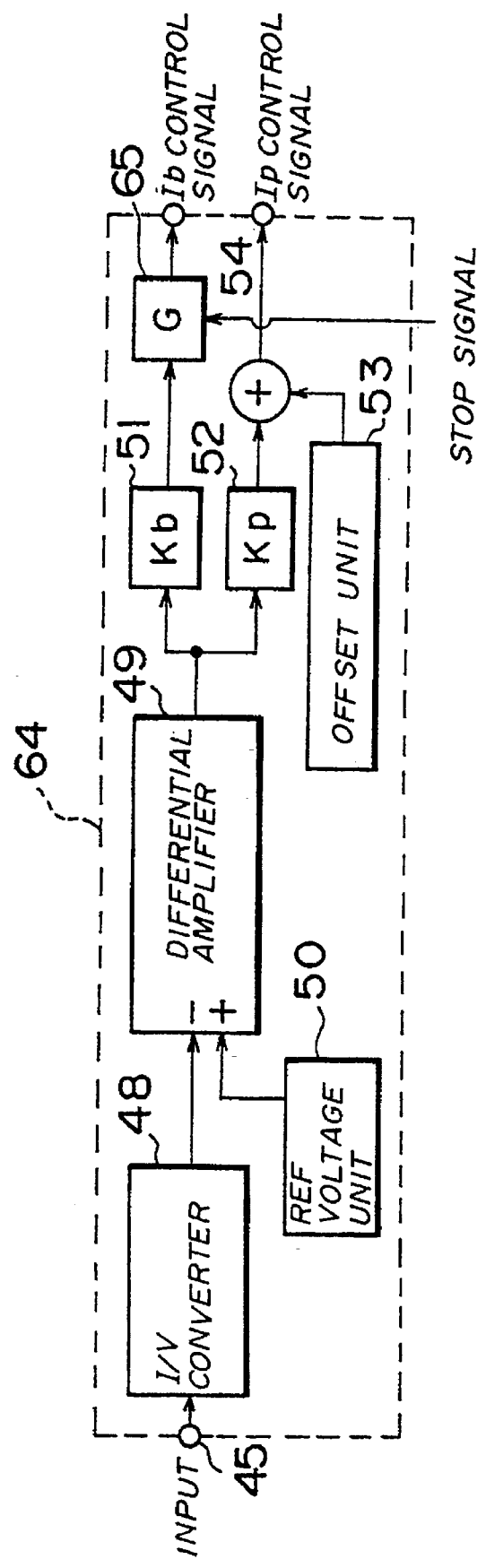
FIG. 18 is a block diagram of an automatic power control unit of the optical transmitter in FIG. 17.

FIG. 18 shows the automatic power control unit (APC) 64 of the optical transmitter in FIG. 17. In FIG. 18, the elements which are the same as corresponding elements in FIG. 12 are designated by the same reference numerals.

In FIG. 18, the APC 64 includes, in addition to all the elements of the APC 36 in FIG. 12, a gate (G) 65 provided at the output of the fixed-gain unit 51. This gate 65 includes an input at which the light-output stop signal from the off-state detecting unit 60 is received. When the light-output stop signal is received, the gate 65 inhibits the outputting of the bias-current control signal from the fixed gain unit 51. Thus, the bias current $I_b$ is not supplied to the laser diode LD, and the light output by the laser diode is stopped.

When the light-output stop signal from the off-state detecting unit 60 is received, the supply of the pulsed current $I_p$ to the laser diode LD may be stopped at the same time that the supply of the bias current $I_b$ to the laser diode LD is stopped. To realize this, it is necessary that a gate which is the same as the above gate 65 be provided at the output of the adder 54.

Figure 19:
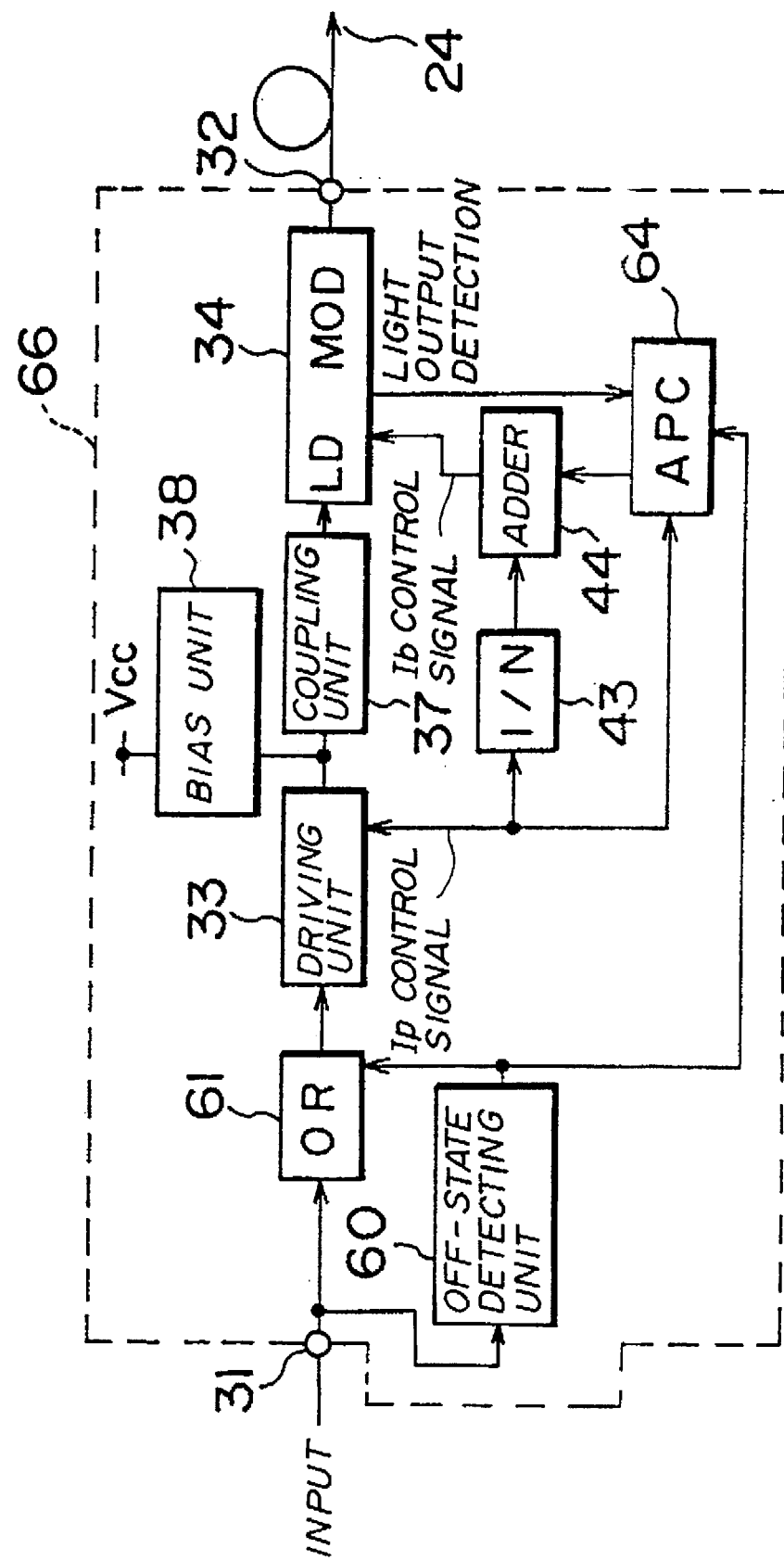
FIG. 19 is a block diagram of an optical transmitter in a further embodiment of the present invention which includes a direct-current supplying unit, an overcurrent preventing unit, and a light-output stopping unit.

FIG. 19 shows an optical transmitter in a further embodiment of the present invention which includes a direct-current supplying unit, an overcurrent preventing unit, and a light-output stopping unit. The optical transmitter in this embodiment is constructed by combining the constructions of the optical transmitters in FIG. 5, 9, and 14. In FIG. 19, the elements which are the same as corresponding elements in FIGS. 5, 9, and 14 are designated by the same reference numerals.

Figure 20:
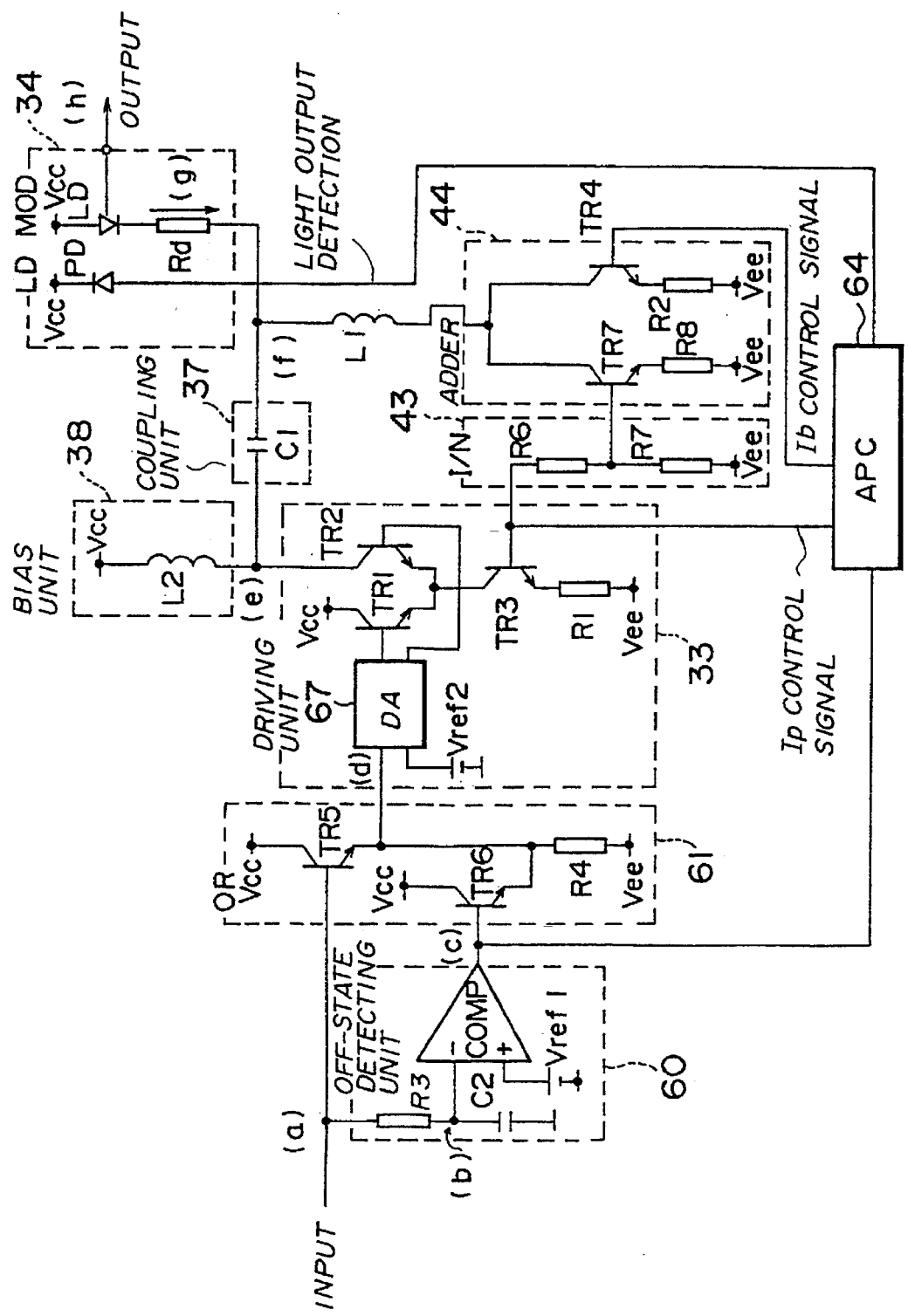
FIG. 20 is a circuit diagram of a circuit of the optical transmitter in FIG. 19.

FIG. 20 shows a detailed structure of a circuit of the optical transmitter in FIG. 19. In FIG. 20, the elements which are the same as corresponding elements in FIGS. 5, 9, and 14 are designated by the same reference numerals.

In FIG. 20, the off-state detecting unit 60 includes a resistor R3, a capacitor C2, and a comparator COMP. The input signal is sent to the capacitor C2 via the resistor R3, and the charge of the input signal is stored in the capacitor C2. The charge stored in the capacitor C2 corresponds to an intermediate voltage which is as high as half a voltage of the input signal indicating the value one "1" since the number of the values one "1" and the number of the values zero "0" included in the input signal can be considered the same. A terminal voltage produced at one end of the capacitor C2 is supplied to a negative input of the comparator COMP. A reference voltage Vref1 which is higher than the above intermediate voltage is supplied from a power supply to a positive input of the comparator COMP.

Therefore, when the input signal in the ON state is supplied to the input of the optical transmitter, the terminal voltage of the capacitor C2, supplied to the negative input of the comparator COMP, is higher than the reference voltage Vref1, supplied to the positive input of the comparator COMP, and the output of the comparator COMP becomes the low state. When the input signal in the OFF state is supplied to the input of the optical transmitter, the discharging of the capacitor C2 is started. Thus, the terminal voltage is immediately reduced and becomes below the reference voltage Vref1, and the output of the comparator COMP becomes the high state.

FIGS. 21A through 21H show an operation of the circuit of the optical transmitter in FIG. 20. In the charts of FIGS. 21A through 21H, waveforms of various signals at various points of the circuit in FIG. 20 which are indicated by the letters (a) through (h) are respectively shown.

As shown in FIG. 21A, the input signal is changed from the ON state "1" to the OFF state "0". At this time, the terminal voltage of the capacitor C2, supplied to the negative input of the comparator COMP is immediately reduced and becomes below the reference voltage Vref1, as shown in FIG. 21B. The off-state detection signal, output from the off-state detecting unit 60, is changed from the low "L" state to the high "H" state, as shown in FIG. 21C. After then, when the input signal in the ON state is supplied again, the terminal voltage of the capacitor C2 at the negative input of the comparator COMP is immediately increased and becomes above the reference voltage Vref1. The off-state detection signal is changed at this time from the high "H" state to the low "L" state.

Referring back to FIG. 20, the OR circuit 61, which is provided to connect the output of the off-state detecting unit 60 to the input of the driving unit 33, includes a transistor TR5, a transistor TR6, and a resistor R4. A base of the transistor TR6 is connected to the output of the off-state detecting unit 60, and an emitter of the transistor TR6 is connected to one end of the resistor R4 and to an emitter of the transistor TR5. A source power line of Vcc (the actuated voltage) is connected to a collector of each of the transistors TR5 and TR6. A base of the transistor TR5 is connected to the input line of the optical transmitter, and an emitter of the transistor TR5 is connected to the input of the driving unit 33. A source power line of Vee (the ground level) is connected to the other end of the resistor R4.

When the input signal is supplied to the input of the optical transmitter, the transistor TR5 is turned ON for a "1" of the input signal and turned OFF for a "0" of the input signal. The actuated-level source voltage Vcc or the ground-level source voltage Vee is supplied to the input of the differential amplifier 67 in accordance with the digital value of the input signal. The transistor TR6 at this time is turned OFF.

When the input signal is changed to the OFF state and the off-state detection signal from the off-state detecting unit 60 is output, the transistor TR6 is turned ON and the transistor TR5 is turned OFF. The actuated-level source voltage Vcc is supplied to the input of the driving unit 33 at this time. This is shown in FIG. 21D. As the actuated-level source voltage Vcc is higher than the reference voltage Vref2, the effect of the supply of the voltage Vcc to the driving unit 33 is the same as the effect of the supply of the value one "1" of the input signal to the driving unit 33. Therefore, the output signal of the DA 67 at this time holds the ON state of the transistor TR2 and holds the OFF state of the transistor TR1.

Consequently, as shown in FIG. 21E, the voltage at the output of the driving unit 33, which is the voltage of the collector of the transistor TR2, is changed from the high state "H" to the low state "L". At this time, the current flows through the laser diode LD from the laser diode module 34 to the driving unit 33 via the coupling unit 37, as shown in FIG. 21G, and the voltage at the input of the laser diode module 34 instantaneously drops, as shown in FIG. 21F. The light output by the laser diode LD at this instant is intensified, as shown n FIG. 21H.

After then, the capacitor C1 of the coupling unit 37 is increasingly charged, and the amount of the current flowing in the laser diode LD is reduced accordingly, as shown in FIG. 21G. After the current of the laser diode being reduced is the same as the bias current supplied by the adder 44, the amount of the current is held to be constant. In accordance with the decrease of the current of the laser diode, the voltage at the input of the laser diode module 34 is increased and held to be constant at an intermediate voltage level, as shown in FIG. 21F. As shown in FIG. 21H, the light output by the laser diode LD is changed in the same manner as that of the current of the laser diode in FIG. 21G.

When the input signal is changed to the ON state again, the voltage at the output of the driving unit 33 is changed in accordance with the digital value of the input signal, as shown in FIG. 21E. At this time, the ON state of the transistor TR2 is changed to the OFF state. As shown in FIG. 21F, the voltage at the input of the laser diode module 34 abruptly rises from the intermediate voltage and is gradually reduced. In accordance with the change in the input voltage, the current flowing in the laser diode LD abruptly drops from the intermediate current and is gradually increased, as shown in FIG. 21G. The amplitude of the pulsed current $I_p$ is centered at this intermediate current when the current flowing in the laser diode is gradually increased. Accordingly, the light output by the laser diode is gradually increased in accordance with the change in the current flowing in the laser diode, as shown in FIG. 21H.

Referring back to FIG. 20, the voltage divider 43 (1/N) includes a resistor R6 and a resistor R7. A voltage of the pulsed-current control signal from the APC 64 is divided by the two resistors R6 and R7, and a resulting voltage from the voltage divider 43 is supplied to a base of a transistor TR7 included in the adder 44. The adder 44 includes a resistor R8, the transistor TR7, the transistor TR4, and the resistor R2. In accordance with the divided voltage from the voltage divider 43, a current flows through the transistor TR7. This current is the above-described offset current $I_{b_{off}}$ and it flows in the laser diode LD. As described previously, the bias-current control signal from the APC 64 is supplied to the base of the transistor TR4, and the bias current $I_b$ flows in the transistor TR4. Therefore, the combined current of the sum of the bias current $I_b$ and the offset current $I_{b_{off}}$ flows in the laser diode LD.

Figure 22:
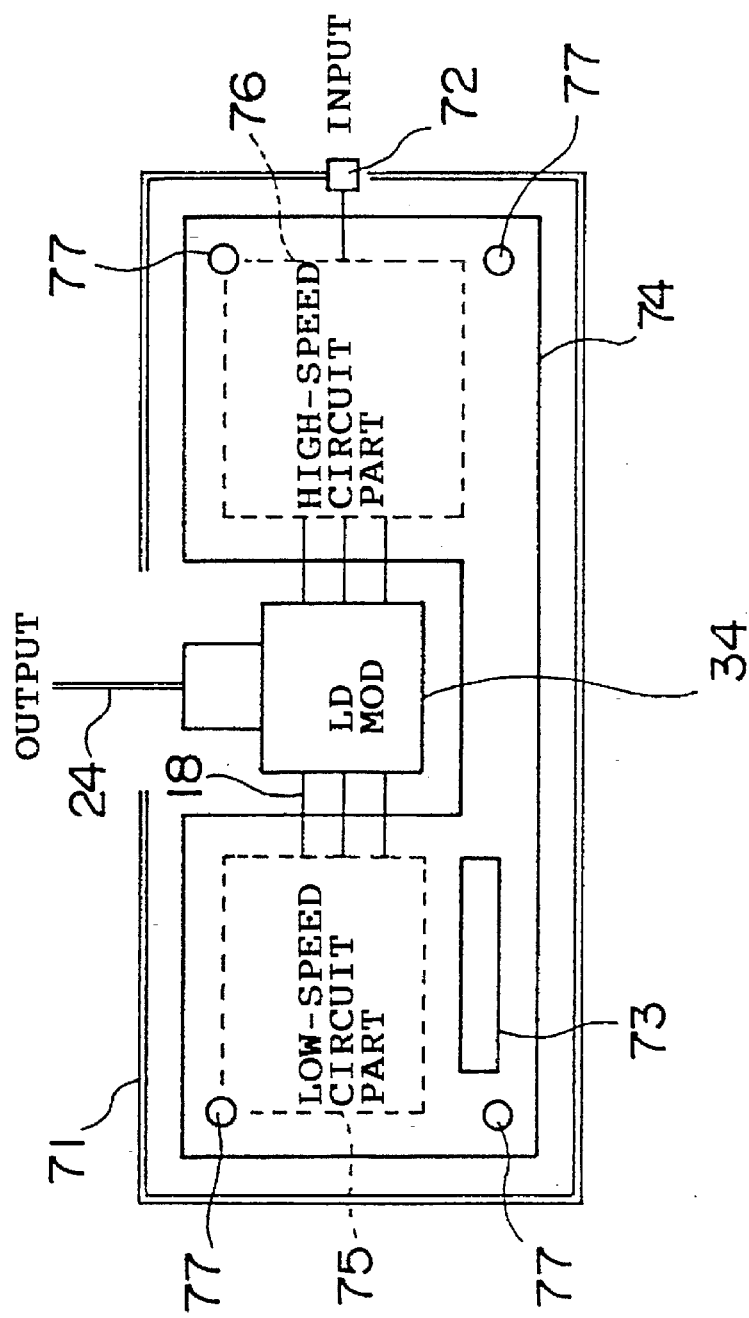
FIG. 22 is a diagram of a module into which the optical transmitter in FIG. 19 is arranged.

FIG. 22 shows a module into which the optical transmitter in FIGS. 19 and 20 is arranged. In the arrangement in FIG. 22, the optical transmitter is enclosed in a metal case 71, and a printed-circuit board (Pt) 74 is internally mounted thereon by screws 77. On the printed-circuit board 74, a low-speed circuit part 75 and a high-speed circuit part 76 are formed. The laser diode module 34 is connected to each of the low-speed circuit part 75 and the high-speed circuit part 76 via the connection terminals 18.

The input signal from an external unit is supplied to the high-speed circuit part 76 via an input connector 72, and this connector 72 is arranged on the case 71. An output connector 73 is arranged on the case 71, and signals from the low-speed circuit part 75 are sent to or received from the outside via the output connector 73. The components of the circuit shown in FIG. 20 are mostly arranged in the high-speed circuit part 76. In the low-speed circuit part 75, a power supply and other components are arranged.

The features of the present invention described above with reference to FIGS. 5 through 18 may be combined to make various variations which are different from the embodiment shown in FIG. 19. A description will be given of some variations of the optical transmitter according to the present invention.

Figure 23:
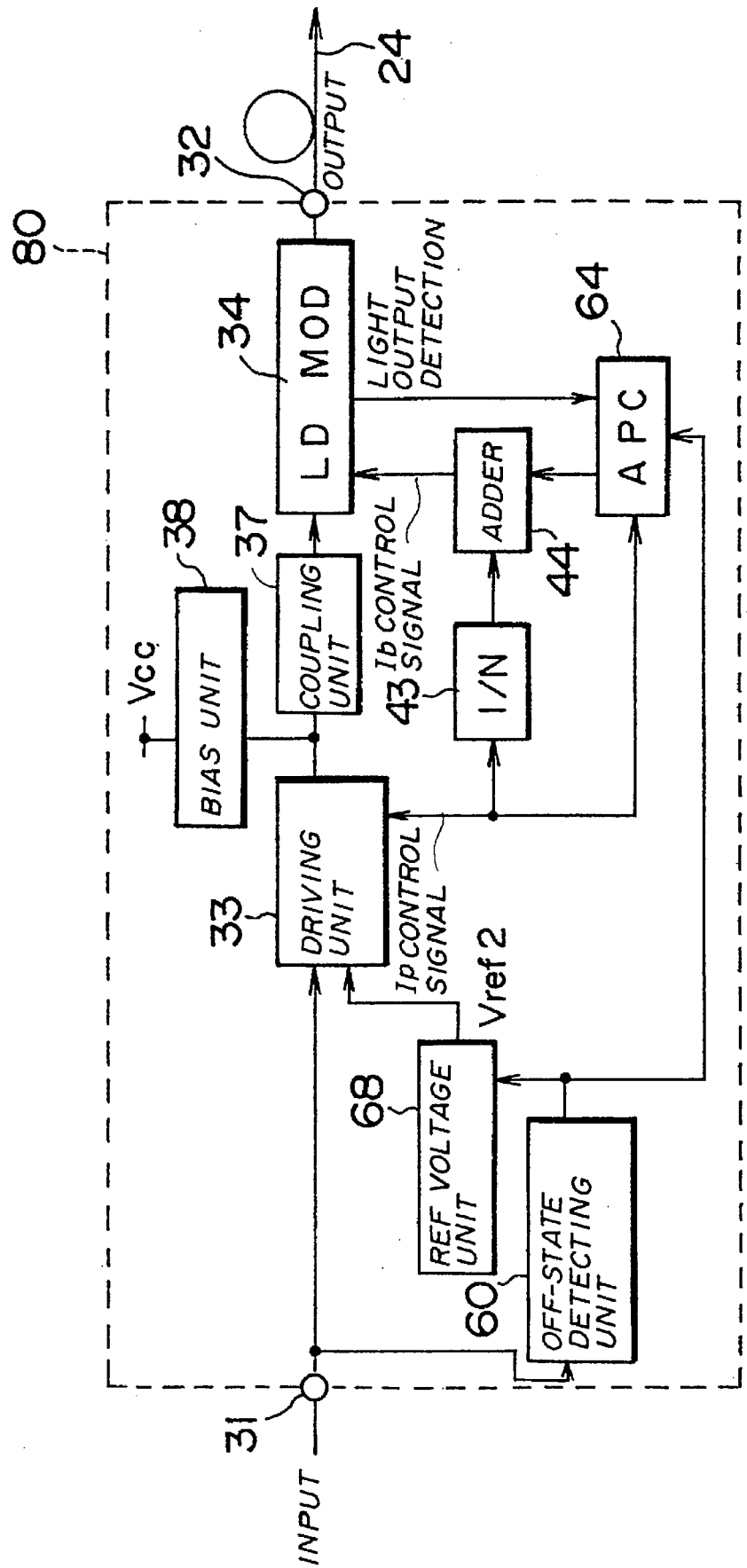
FIGS. 23, 24, and 25 are block diagrams of variations of the optical transmitter in the embodiment in FIG. 19.
Figure 24:
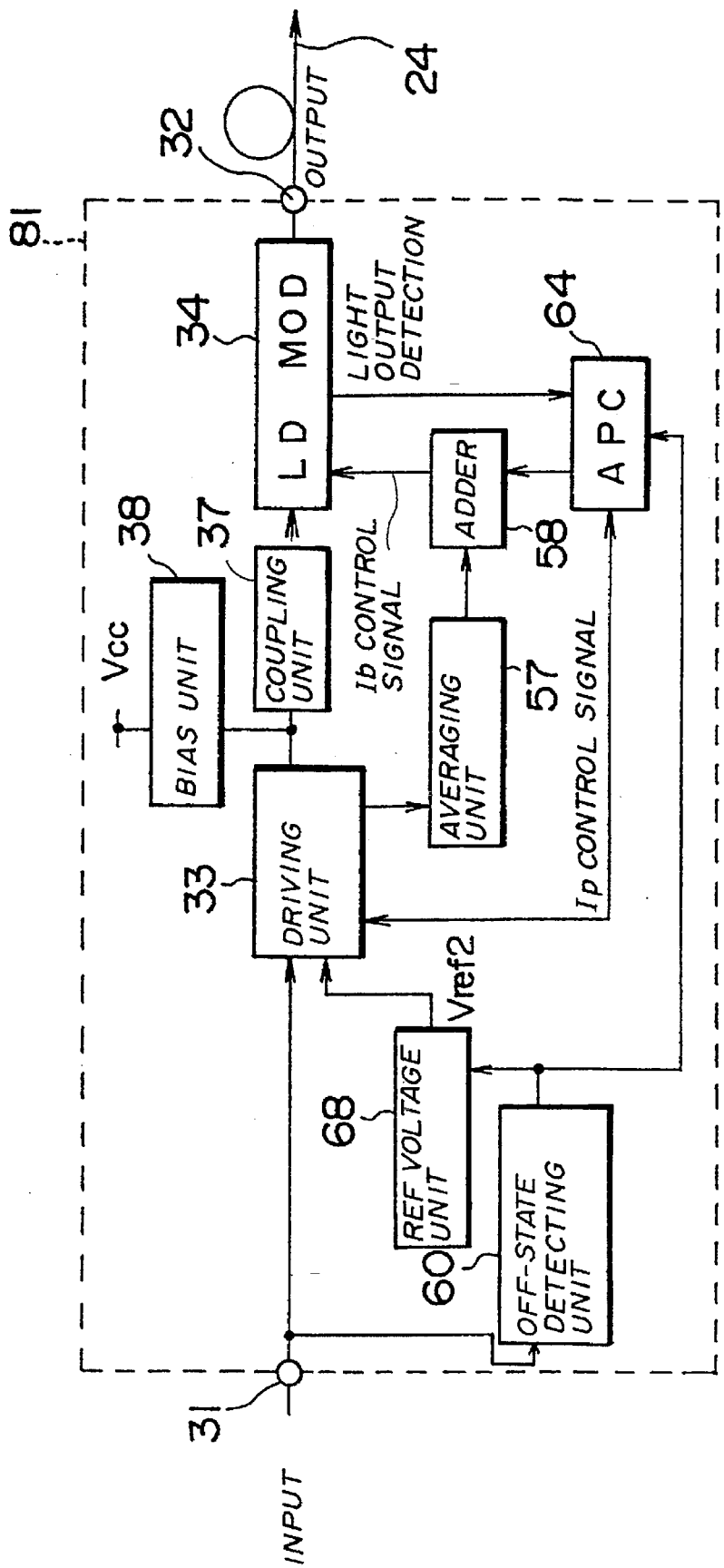
Figure 25:
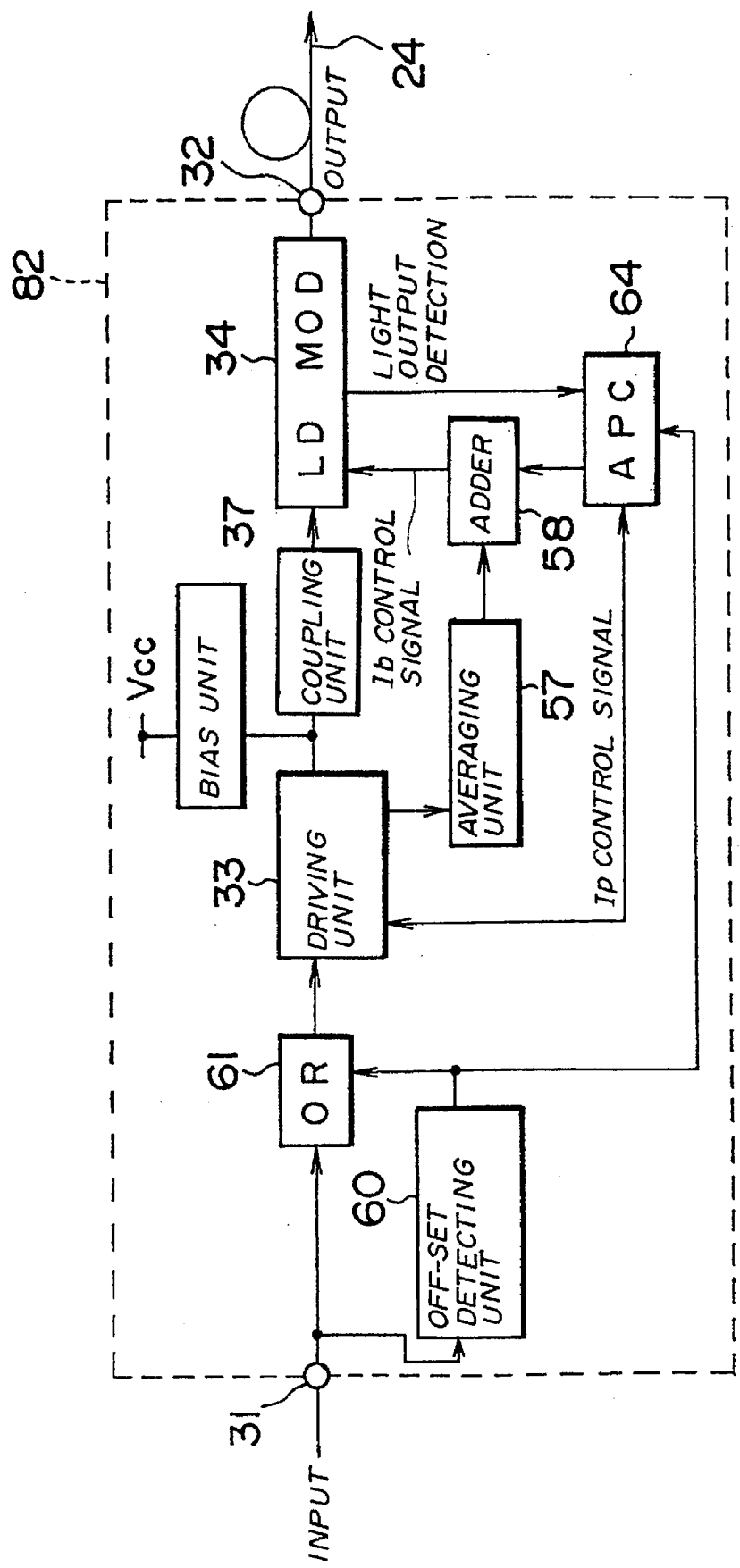

FIGS. 23, 24 and 25 show variations of the optical transmitter in the embodiment in FIG. 19.

An optical transmitter 80 in FIG. 23 is constructed by combining the constructions of the optical transmitters in FIG. 9, FIG. 16, and FIG. 17. The construction and operation of the optical transmitter 80 are apparent from the descriptions of the previous embodiments already given above, and a description thereof will be omitted.

An optical transmitter 81 in FIG. 24 is constructed by combining the constructions of the optical transmitters in FIG. 10, FIG. 16, and FIG. 17. The construction and operation of the optical transmitter 81 are apparent from the descriptions of the previous embodiments, and a description thereof will be omitted.

An optical transmitter 82 in FIG. 25 is constructed by combining the constructions of the optical transmitters in FIG. 10 and FIG. 17. The construction and operation of the optical transmitter 82 are apparent from the descriptions of the previous embodiments, and a description thereof will be omitted.

Further, the present invention is not limited to the above-described embodiments, and variations and modifications may be made without departing from the scope of the present invention.

What is claimed is:

1. An optical transmitter comprising:
   a laser diode module including a laser diode which iutputs a light signal to an optical transmission line;
   a driving unit for driving said laser diode so that a pulsed current depending on an input signal indicative of data to be transmitted is made to flow in the laser diode;
   a bias unit which includes an inductor and supplies a bias current, via the inductor, to the output of the driving unit to enable a switching of a transistor of an output portion of the driving unit; and
   a coupling unit for connecting an output of the driving unit to an input of the laser diode module, said coupling unit allowing an alternating current to flow in the laser diode and inhibiting the output of the driving unit from being subjected to a direct current from the laser diode module,
   said coupling unit including a capacitor provided between said laser diode module and said driving unit.

2. An optical transmitter comprising:
   a laser diode module including a laser diode which outputs a light signal to an optical transmission line;
   a driving unit for driving said laser diode in accordance with an input signal indicative of data to be transmitted;
   a coupling unit for connecting an output of the driving unit to an input of the laser diode module, said coupling unit allowing an alternating current to flow in the laser diode and inhibiting the output of the driving unit from being subjected to a direct current from the laser diode module; and
   a power control unit for controlling a bias current, supplied to the laser diode, in accordance with a power of the light output by the laser diode, and for controlling a pulsed current, which is supplied by the driving unit to the laser diode in accordance with the input signal, in accordance with the power of the light output by the laser diode.

3. The optical transmitter according to claim 2, further comprising:
   a direct-current supplying unit which supplies an offset current to the laser diode, said offset current being added to the pulsed current so that an amplitude of the pulsed signal is increased by an amplitude of the offset current.

4. The optical transmitter according to claim 3, wherein said direct-current supplying unit comprises a unit which supplies a first offset current to the laser diode, an amplitude of said first offset current being 1/N times the amplitude of the pulsed current, where N is an arbitrary number.

5. The optical transmitter according to claim 3, wherein said direct-current supplying unit comprises a unit which determines an average of the pulsed current supplied by the driving unit to the laser diode and supplies a second offset current to the laser diode in accordance with the determined average.

6. An optical transmitter comprising:
   a laser diode module including a laser diode which outputs a light signal to an optical transmission line;
   a driving unit for driving said laser diode in accordance with an input signal indicative of data to be transmitted;
   a coupling unit for connecting an output of the driving unit to an input of the laser diode module, said coupling unit allowing an alternating current to flow in the laser diode and inhibiting the output of the driving unit from being subjected to a direct current from the laser diode module; and
   an off-state detecting unit for detecting whether the input signal supplied to an input of the driving unit is in an OFF state, said off-state detecting unit setting the input of the driving unit an ON state when the input signal is detected to be in the OFF state.

7. An optical transmitter comprising:
   a laser diode module including a laser diode which outputs a light signal to an optical transmission line;
   a driving unit for driving said laser diode in accordance with an input signal indicative of data to be transmitted;
   a coupling unit for connecting an output of the driving unit to an input of the laser diode module, said coupling unit allowing an alternating current to flow in the laser diode and inhibiting the output of the driving unit from being subjected to a direct current from the laser diode module; and
   an off-state detecting unit for detecting whether the input signal supplied to an input of the driving unit is in an OFF state, said off-state detecting unit determining a parameter of the driving unit when the input signal is detected to be in the OFF state, so that the output of the driving unit is set in an ON state.

8. An optical transmitter comprising:
   a laser diode module including a laser diode which outputs a light signal to an optical transmission line;
   a driving unit for driving said laser diode in accordance with an input signal indicative of data to be transmitted;
   a coupling unit for connecting an output of the driving unit to an input of the laser diode module, said coupling unit allowing an alternating current to flow in the laser diode and inhibiting the output of the driving unit from being subjected to a direct current from the laser diode module; and an off-state detecting unit for detecting whether the input signal supplied to an input of the driving unit is in an OFF state, said off-state detecting unit inhibiting the outputting of the light signal from the laser diode module when the input signal is detected to be in the OFF state.

9. The optical transmitter according to claim 6, wherein said off-state detecting unit inhibits the outputting of the light signal from the laser diode module when the input signal is detected to be in the OFF state.

10. An optical transmitter comprising:

a laser diode module including a laser diode which outputs a light signal to an optical transmission line;

a driving unit for driving said laser diode in accordance with an input signal indicative of data to be transmitted;

a coupling unit for connecting an output of the driving unit to an input of the laser diode module, said coupling unit allowing an alternating current to flow in the laser diode and inhibiting the output of the driving unit from being subjected to a direct current from the laser diode module; and an off-state detecting unit for detecting whether the input signal supplied to an input of the driving unit is in an OFF state, wherein said off-state detecting unit comprises a unit which detects the OFF state of the input signal in accordance with an average of an amplitude of the input signal.

11. The optical transmitter according to claim 3, wherein said direct-current supplying unit supplies an offset current to the laser diode so that an amplitude of the pulsed signal is centered at an amplitude of the supplied offset current.

12. The optical transmitter according to claim 1, further comprising:

a case which encloses said laser diode module, said driving unit, and said coupling unit, wherein said laser diode module further includes a photodetector which detects a power of the light output by the laser diode.

13. The optical transmitter according to claim 2, wherein both the bias current supplied to the laser diode and the pulsed current supplied by the driving unit to the laser diode are varied in accordance with a change in a temperature of the laser diode.

14. The optical transmitter according to claim 1, wherein said laser diode module comprises:

a case for hermetically sealing the laser diode;

a photodetector for detecting a power of the light output by the laser diode;

a supporting base, provided within said case, for supporting the laser diode and the photodetector;

connection terminals for connecting the laser diode and the photodetector to an external unit; and an optical unit, provided within said case, for transmitting the light signal output by the laser diode to the optical transmission line, wherein said laser diode module includes no element which controls a temperature of the laser diode to be constant.

15. A laser diode module comprising:

a laser diode;

a case for hermetically sealing the laser diode;

a photodetector for detecting a power of a light output by the laser diode;

a supporting base, provided within said case, for supporting the laser diode and the photodetector;

connection terminals for connecting the laser diode and the photodetector to an external unit;

a damping resistor connected to said laser diode and one of the connection terminals and externally supplied with a pulse current via a capacitor connected to said one of the connection terminals; and an optical unit, provided within said case, through which the light signal output by the laser diode is transmitted to an optical transmission line, wherein said laser diode module includes no element which controls a temperature of the laser diode to be constant.

16. An optical transmitter comprising:

a laser diode module including a laser diode which outputs a light signal to an optical transmission line;

a driving unit for driving said laser diode in accordance with an input signal indicative of data to be transmitted;

a coupling unit for connecting an output of the driving unit to an input of the laser diode module, said coupling unit allowing an alternating current to flow in the laser diode and inhibiting the output of the driving unit from being subjected to a direct current from the laser diode module; and a power control unit for controlling a bias current, supplied to the laser diode, in accordance with a power of the light output by the laser diode, and for controlling a pulsed current, which is supplied by the driving unit to the laser diode in accordance with the input signal, in accordance with the power of the light output by the laser diode.

17. The optical transmitter according to claim 16, wherein both the bias current supplied to the laser diode and the pulsed current supplied by the driving unit to the laser diode are varied in accordance with a change in a temperature of the laser diode.

* * * * *